(12) United States Patent
Sigmund et al.

(10) Patent No.: US 10,551,107 B2
(45) Date of Patent: Feb. 4, 2020

(54) HYBRID TWIST TRAY ICE MAKER

(71) Applicant: WHIRLPOOL CORPORATION, Benton Harbor, MI (US)

(72) Inventors: Daniel L. Sigmund, Stevensville, MI (US); Jerry M. Visin, Benton Harbor, MI (US); Lindsey A. Wohlgamuth, St. Joseph, MI (US); Carolina Arriaga, San Francisco, CA (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/415,441

(22) Filed: May 17, 2019

(65) Prior Publication Data

US 2019/0271496 A1 Sep. 5, 2019

Related U.S. Application Data

(63) Continuation-in-part of application No. 15/673,995, filed on Aug. 10, 2017, now Pat. No. 10,309,707, which is a continuation-in-part of application No. 14/640,494, filed on Mar. 6, 2015, now Pat. No. 9,746,229.

(51) Int. Cl.
| | |
|---|---|
| *F23C 5/06* | (2006.01) |
| *F25C 1/10* | (2006.01) |
| *F25C 1/243* | (2018.01) |
| *F28F 3/04* | (2006.01) |
| *F25C 5/20* | (2018.01) |
| *F25C 5/06* | (2006.01) |

(52) U.S. Cl.
CPC ............... *F25C 5/06* (2013.01); *F25C 1/10* (2013.01); *F25C 1/243* (2013.01); *F25C 5/22* (2018.01); *F28F 3/04* (2013.01); *F25C 2305/022* (2013.01); *F25C 2500/08* (2013.01)

(58) Field of Classification Search
CPC .... F25C 5/06; F25C 5/22; F25C 1/243; F25C 1/10; F25C 2305/022; F25C 1/125; F25C 1/18; F25C 1/246
See application file for complete search history.

(56) References Cited

U.S. PATENT DOCUMENTS

| | | | |
|---|---|---|---|
| 4,332,146 | A | 6/1982 | Yamazaki et al. |
| 9,746,229 | B2 | 8/2017 | Visin et al. |
| 2008/0264082 | A1 | 10/2008 | Tikhonov et al. |
| 2014/0165611 | A1 | 6/2014 | Boarman et al. |
| 2017/0336124 | A1 | 11/2017 | Visin et al. |

FOREIGN PATENT DOCUMENTS

WO 2008056957 A3 5/2008

*Primary Examiner* — Elizabeth J Martin
(74) *Attorney, Agent, or Firm* — Price Heneveld LLP

(57) ABSTRACT

An ice maker includes a harvest motor and an ice tray operably coupled to the harvest motor. The ice tray has a plurality of heat sinks coupled to a bottom section of ice forming cavities on the ice tray. The harvest motor is operable to twist the ice tray for causing the plurality of heat sinks to move relative to each other for releasing ice pieces from the ice forming cavities.

20 Claims, 18 Drawing Sheets

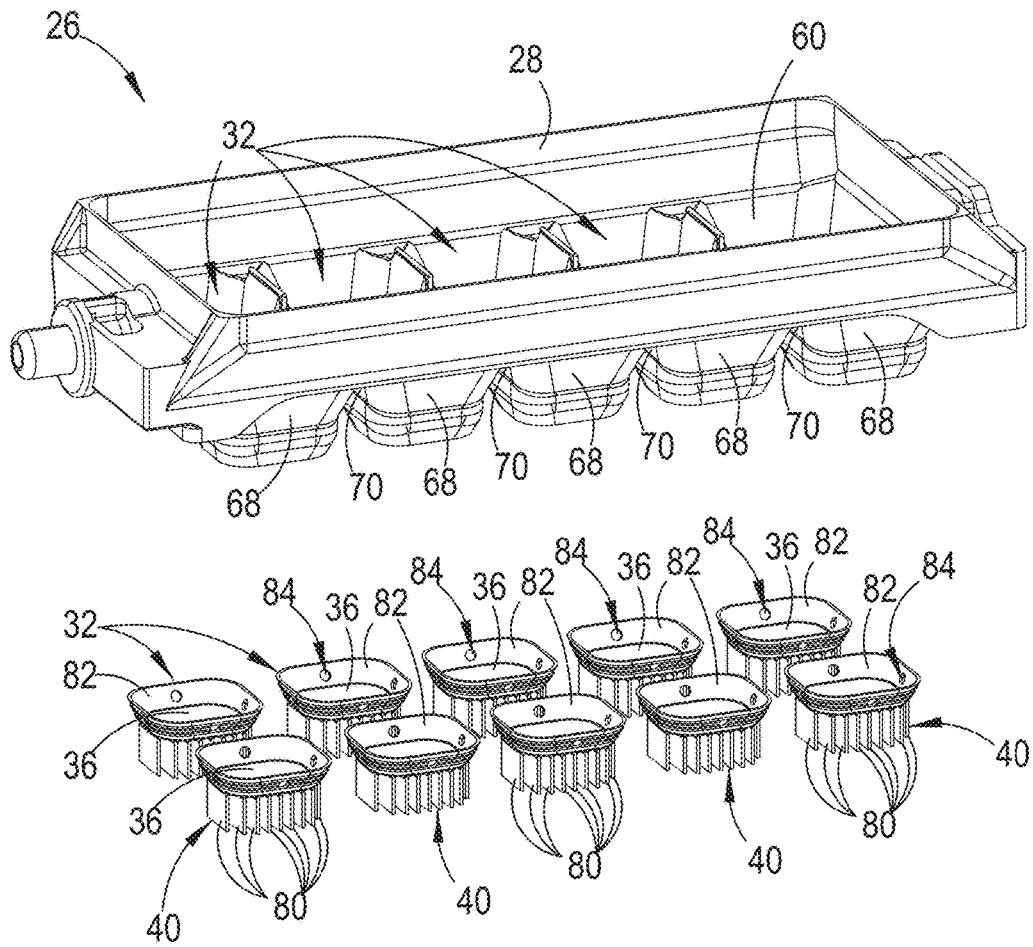
FIG. 9
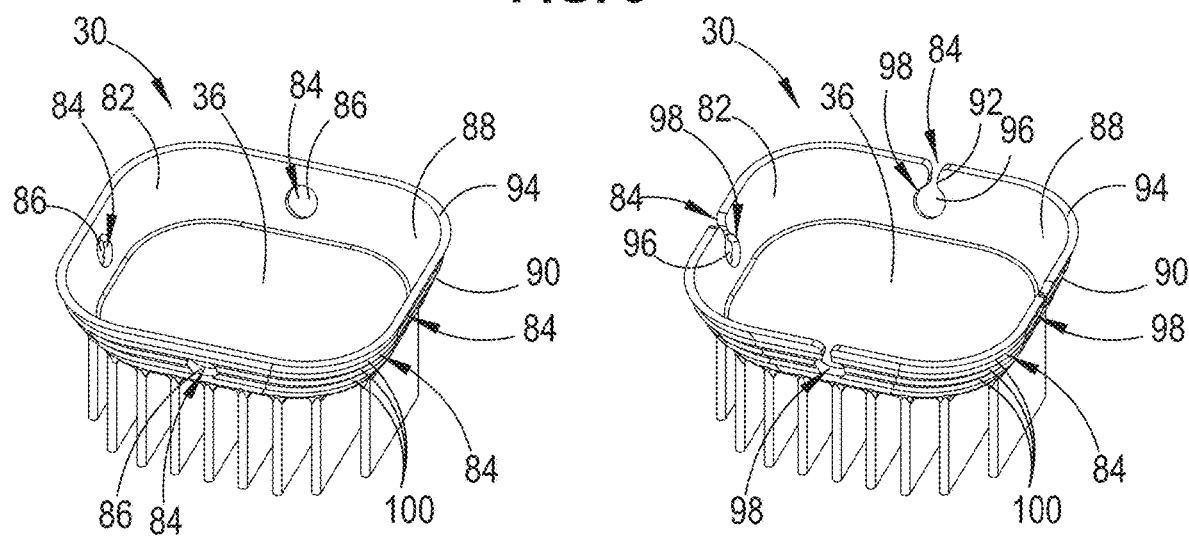
FIG. 10  FIG. 10A

HYBRID TWIST TRAY ICE MAKER

CROSS-REFERENCE TO RELATED APPLICATION

The present application is a continuation-in-part application of U.S. patent application Ser. No. 15/673,995 filed Aug. 10, 2017, now U.S. Pat. No. 10,309,707, entitled HYBRID TWIST TRAY ICE MAKER, which is a continuation-in-part application of U.S. Pat. No. 9,746,229 granted Aug. 29, 2017, entitled HYBRID TWIST TRAY ICE MAKER, the entire contents of which are hereby incorporated herein by reference in their entireties.

FIELD OF THE INVENTION

The present disclosure generally relates to an ice tray for an ice maker, and more particularly to an ice maker having a twistable ice tray that includes a number of heat sinks attached to a lower portion thereof for efficiently cooling a bottom surface of each ice forming cavity on the ice tray, thereby promoting quick and efficient ice formation. The present disclosure also relates to the corresponding methods of operating the ice maker and forming such an ice tray.

BACKGROUND OF THE INVENTION

It is generally understood that ice trays may be constructed with ice cavities for making ice pieces in shapes and sizes convenient for a user's intended application, such as beverage cooling. Commonly, ice trays are formed entirely of polymeric materials to allow for twisting the ice tray to release ice pieces. However, the polymeric materials used for these ice trays typically have low thermal conductivity, which can result in slow freezing times for water introduced to the ice tray. In some instances, ice trays have been formed entirely of rigid metal materials, which provide little flexibility and make ice harvesting relatively difficult.

SUMMARY OF THE PRESENT INVENTION

According to one aspect of the present disclosure, an ice tray includes a flexible structure having discrete ice forming cavities. A plurality of heat sinks is coupled to the flexible structure. Each heat sink has an upper portion that defines a bottom surface of at least one of the ice forming cavities and a lower portion with at least one member protruding from the upper portion for distributing heat away from the bottom surface.

According to another aspect of the present disclosure, an ice maker includes a harvest motor and an ice tray operably coupled to the harvest motor. The ice tray has a plurality of heat sinks coupled to a bottom section of ice forming cavities on the ice tray. The harvest motor is operable to twist the ice tray for causing the plurality of heat sinks to move relative to each other for releasing ice pieces from the ice forming cavities.

According to yet another aspect of the present disclosure, a method of forming an ice tray includes providing a plurality of heat sinks, each having an upper portion that defines a bottom surface of an ice forming cavity and a lower portion with at least one member protruding from the upper portion for distributing heat away from the bottom surface. The method also includes molding a flexible structure over a peripheral edge the upper portion of each of the plurality of heat sinks to define sidewalls of the ice forming cavities. A seal is formed between the peripheral edge and the sidewalls to contain water in the ice forming cavities.

According to another aspect of the present disclosure, an ice tray includes a flexible structure defining sidewalls of first and second ice forming cavities. The first and second heat sinks have an upper portion defining a bottom surface of the respective first and second ice forming cavities and an upward protruding flange extending from the bottom surface of each of the first and second ice forming cavities. The flexible structure is molded around the upward protruding flange.

According to another aspect of the present disclosure, an ice maker includes a harvest motor, a fan, and an ice tray operably coupled to the harvest motor. The ice tray has a flexible structure and a plurality of heat sinks coupled to the flexible structure, wherein the heat sinks are disposed at bottom portions of ice forming cavities of the ice tray. The portions of the flexible structure are molded over portions of the plurality of heat sinks to form seals, and the harvest motor is selectively operable to twist the ice tray about a rotational axis so that the flexible structure flexes. The plurality of heat sinks move relative to each other to release ice pieces from the ice forming cavities. The fan is positioned to direct an airflow along the plurality of heat sinks, and each of the plurality of heat sinks includes an exposed surface area that is configured to be exposed to the airflow. A first heat sink is located a first distance from the fan and defines a first exposed surface area. A second heat sink is located a second distance from the fan and defines a second exposed surface area. The first distance is less than the second distance, and the first exposed surface area is less than the second exposed surface area.

According to another aspect of the present disclosure, an ice maker includes a harvest motor, an axle member, and an ice tray operably coupled to the harvest motor and the axle member. The ice tray has a flexible structure and a plurality of heat sinks coupled to the flexible structure, wherein the heat sinks are disposed at bottom portions of ice forming cavities of the ice tray. The harvest motor is selectively operable to twist the ice tray about a rotational axis so that the flexible structure flexes and the plurality of heat sinks move relative to each other to release ice pieces from the ice forming cavities. The ice tray may be agitated between a first position and a second position in a rocking motion during ice formation. The plurality of heat sinks include a first heat sink with a first exposed surface area and a second heat sink with a second exposed surface area. The first exposed surface area is not equal to the second exposed surface area.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 9 is an exploded top perspective view of the ice tray shown in FIG. 5, illustrating a flexible portion of the ice tray separated from a plurality of heat sinks;

FIG. 10 is a top perspective view of an individual heat sink with an attachment feature, according to one embodiment;

FIG. 10A is a top perspective view of an individual heat sink having an additional embodiment of an attachment feature;

DETAILED DESCRIPTION OF EMBODIMENTS

Figure 3:
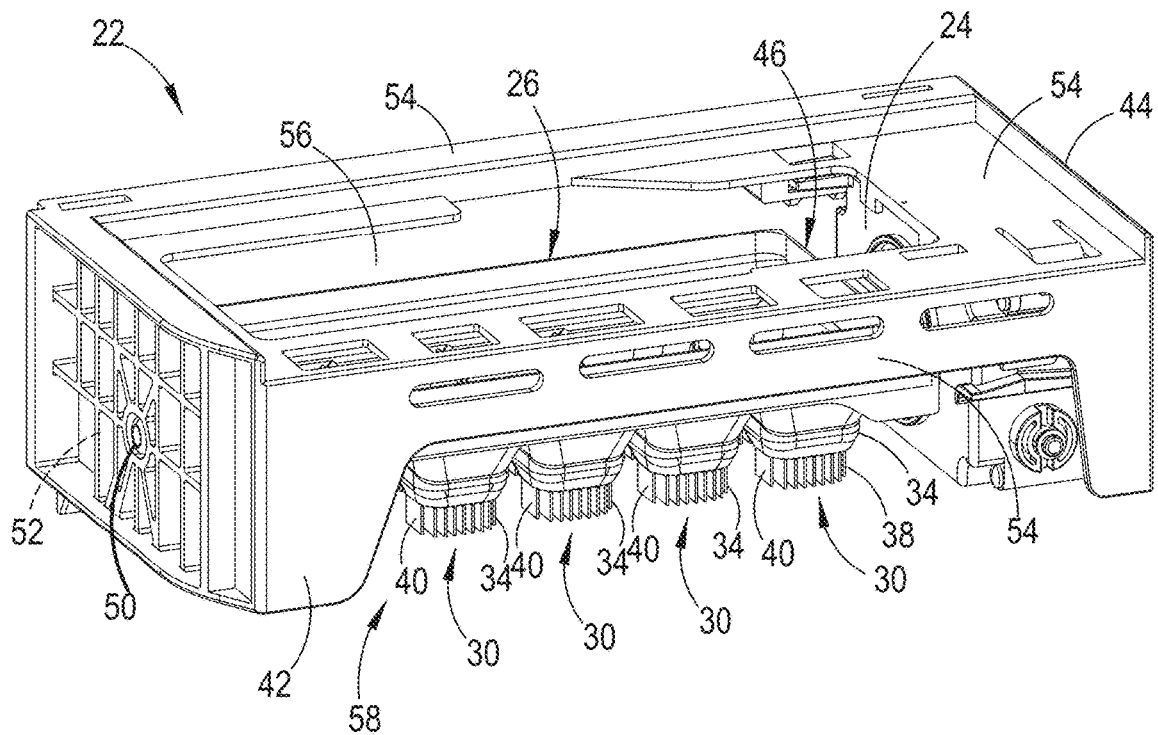
FIG. 3 is a top perspective view of an ice maker having an ice tray, according to one embodiment.

For purposes of description herein, the terms "upper," "lower," "right," "left," "rear," "front," "vertical," "horizontal," and derivatives thereof shall relate to the ice maker as oriented in FIG. 3. However, it is to be understood that the ice maker may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
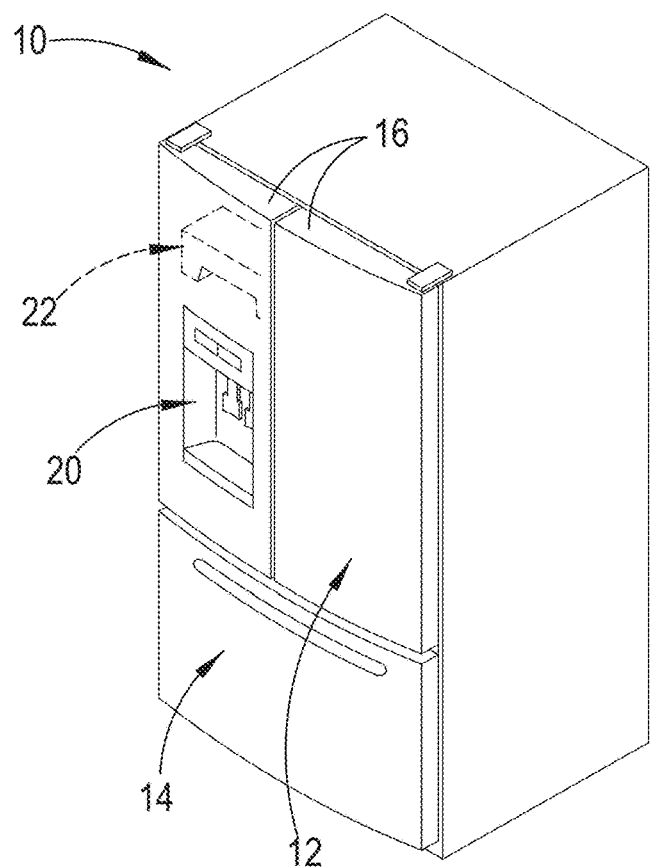
FIG. 1 is a top perspective view of a refrigerator that has a refrigeration compartment enclosable with doors, one door having an ice dispenser, according to one embodiment.
Figure 2:
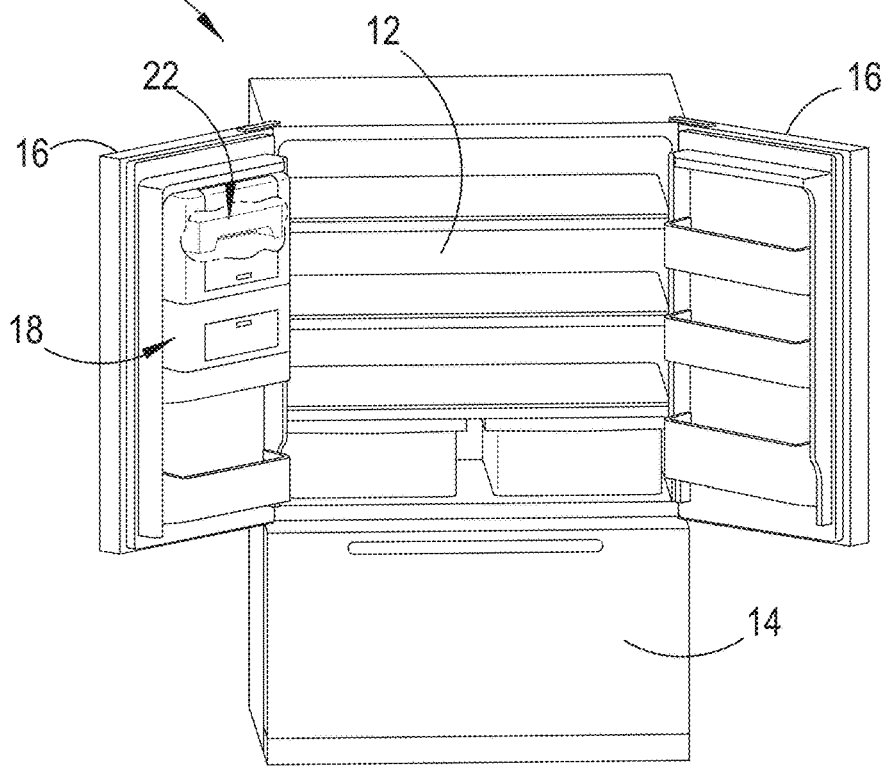
FIG. 2 is a front elevational view of the refrigerator shown in FIG. 1, having the doors open to expose an ice storage compartment and an ice maker, according to one embodiment.

Referring initially to FIGS. 1-2, a refrigerator 10 is depicted having a refrigeration compartment 12 situated above a freezer compartment 14. The illustrated embodiment of the refrigerator 10 is shown with a pair of doors 16 that are movable to enclose the refrigeration compartment 12, whereby one of the doors 16 includes an ice storage container 18 that delivers ice to an associated ice dispenser 20. The ice dispenser 20 may be used for dispensing or otherwise removing ice from the refrigerator 10, and is typically accessible from the front side of the door 16 for use when the door 16 is in a closed position. The ice storage container 18 receives ice pieces from an ice maker 22 located above the ice storage container 18 on the door 16. It is, however, contemplated that the ice maker 22 in other embodiments may alternatively be located within the refrigeration compartment 12, the freezer compartment 14, within any door of the appliance, or external to the appliance, such as on a top surface of a refrigerator 10. Moreover, it is contemplated that the refrigerator 10 can be differently configured in alternative embodiments, such as with a single door enclosing the refrigeration compartment 12, an ice storage container without an ice dispenser, and the freezer compartment situated within, above, or on the side of the refrigeration compartment. Further, it is conceivable that the appliance associated with the ice maker 22 of the present disclosure may alternatively include a freezer appliance, a counter-top appliance, or other form of consumer appliance.

Referring now to FIGS. 3-17A, reference numeral 22 generally designates an ice maker that includes a harvest motor 24 and an ice tray 26 operably coupled to the harvest motor 24. The ice tray 26 has a flexible structure 28 and a plurality of heat sinks 30 coupled to a bottom section of discrete ice forming cavities 32 on the ice tray 26. Each heat sink 30 has an upper portion 34 that defines a bottom surface 36 of at least one of the ice forming cavities 32 and a lower portion 38 with at least one heat dissipation member 40 protruding down from the upper portion 34. The heat dissipation member 40 of the heat sink 30 is configured to distribute heat away from the bottom surface 36 of the corresponding ice forming cavity 32, thereby promoting quick and efficient ice formation, as well as the potential for unidirectional solidification of water for clear ice formation. After ice pieces have formed in the ice forming cavities 32, the harvest motor 24 is operable to twist the ice tray 26 for causing the flexible structure 28 to elastically distort for releasing ice pieces, such that the plurality of heat sinks 30 move relative to each other when the ice tray 26 is twisted. It is also contemplated that in another embodiment, the ice tray 26 disclosed herein may be manually twisted by hand, without the use of a harvest motor to release the ice pieces, while similarly realizing the benefits of quick and efficient ice formation.

With respect to the various methods of clear ice formation, it is generally appreciated that unidirectional solidification of water to form clear ice may be accomplished in various ways, including single techniques and the combination of techniques. These techniques and methods are described in more detail in U.S. patent application Ser. No. 13/713,244 entitled "CLEAR ICE MAKER," now U.S. Pat. No. 9,518,773 issued Dec. 13, 2016, which is incorporated by reference herein in its entirety. Accordingly, it is contemplated that additional embodiments of the illustrated ice maker 22 may include other features to promote clear ice formation, such as agitation of the ice tray 26, warm air circulation across the top surface of water in the ice forming cavities 32, among other techniques to promote unidirectional solidification of water in the ice forming cavities 32.

Figure 4:
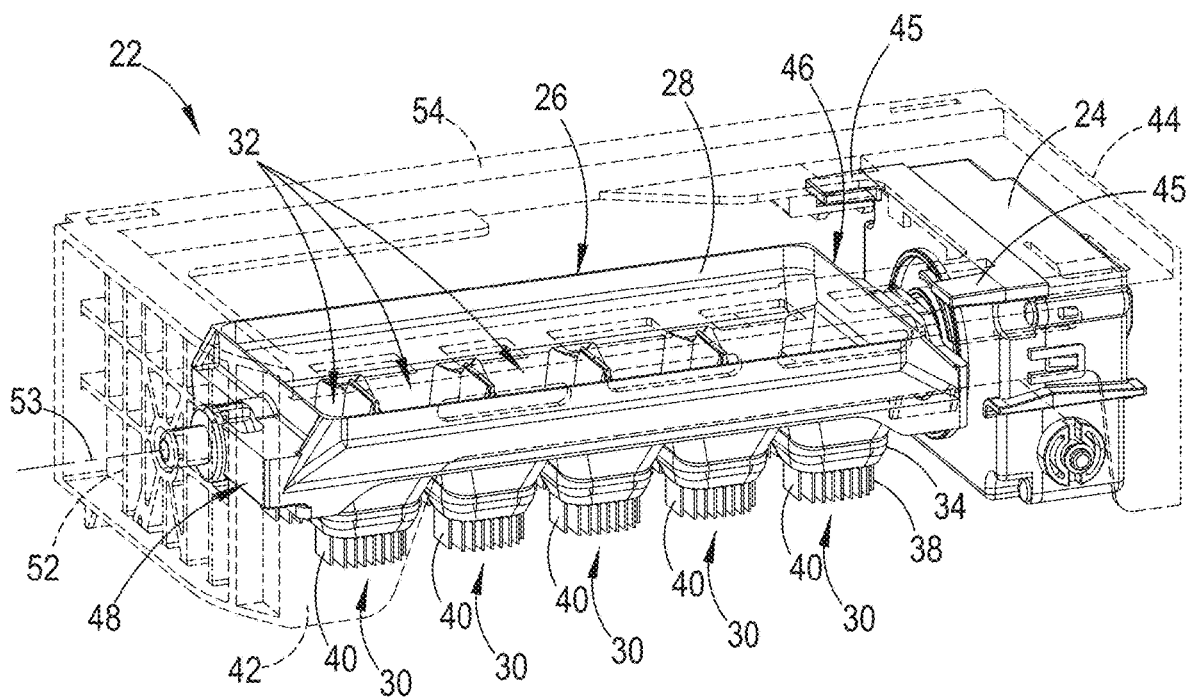
FIG. 4 is a top perspective view of the ice maker shown in FIG. 3, having portions of the ice maker housing shown in phantom lines to illustrate the ice tray operably engaged with a harvest motor.

As illustrated in FIGS. 3-4, the ice maker 22 includes the ice tray 26 suspended across an interior volume of a housing 42 that substantially encloses the harvest motor 24 and the ice tray 26. The harvest motor 24 is rigidly secured proximate a first end wall 44 of the housing 42 by a pair of tabs 45 that extend from an upper region of the motor housing to engage horizontal slots in upper structural members 54 of the housing 42. A first end 46 of the ice tray 26 is operably coupled with the harvest motor 24 and an opposing second end 48 of the ice tray 26 is rotatably coupled with a bearing aperture 50 in a second end wall 52 of the housing 42, opposite the first end wall. As such, a rotational axis 53 of the ice tray 26 is defined between the points of attachment of the first and second ends 46, 48 of the ice tray 26. The first and second end walls 44, 52 of the housing 42 are interconnected by structural members 54, some of which have various attachment features for clips or other securing elements of the corresponding appliance or subcomponents thereof to engage the ice maker and support the ice maker in the door 16 of the refrigerator 10. The housing 42 provides a top opening 56 above the ice tray 26 to allow water to be injected into at least one of the ice forming cavities 32 on the ice tray 26. Similarly, the housing 42 includes a bottom opening 58 below the ice tray 26 to allow ice pieces to dispense from the ice maker 22 into the ice storage container 18. It is understood that in additional embodiments, the housing 42 and arrangement of the ice tray 26 and harvest motor 24 with respect to the housing 42 may be alternatively configured from the illustrated embodiment.

Figure 5:
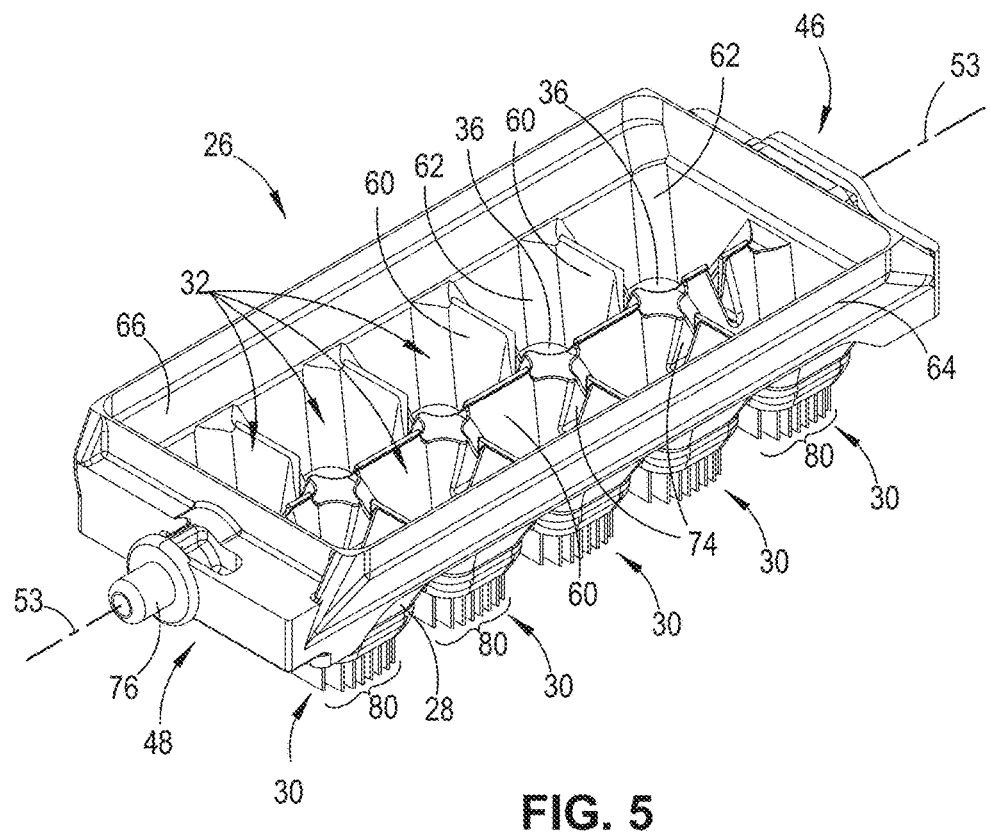
FIG. 5 is a top perspective view of an ice tray, according to one embodiment of the present disclosure.
Figure 7:
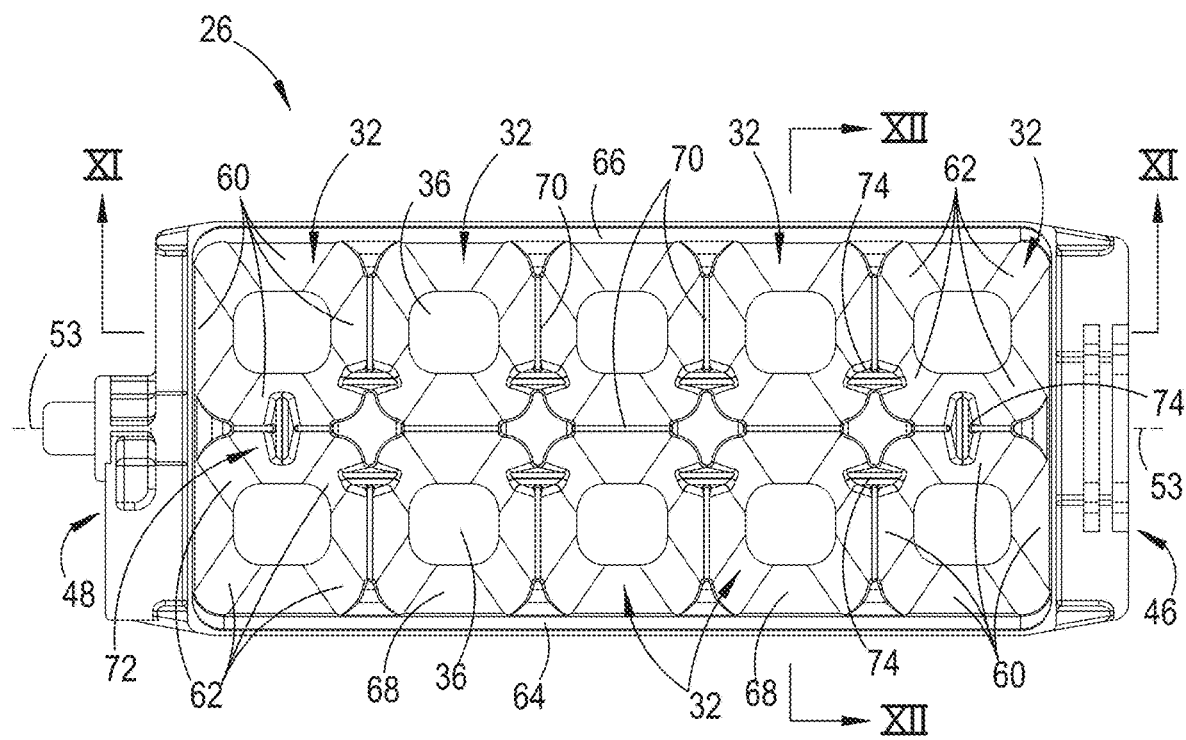
FIG. 7 is a top plan view of the ice tray shown in FIG. 5.

With reference to FIGS. 5 and 7, the illustrated embodiment of the ice tray 26 includes two rows of discrete ice forming cavities 32 extending in-line and on opposing sides of the rotational axis 53 of the ice tray 26. The depicted rows of ice forming cavities 32 each include five individual cavities, although it is contemplated that each row may include more or fewer ice forming cavities 32 in additional embodiments of the ice tray 26. Further, it is conceivable that additional embodiments of ice forming tray 26 may include more rows, a single row, or another uniform or otherwise non-uniform distribution of ice forming cavities 32 on the ice tray 26. Each ice forming cavity 32 in the illustrated embodiment is defined by the bottom surface 36 and sidewall surfaces 60 that extend upward from the bottom surface 36 to contain water accumulated on the bottom surface 36. The bottom surface 36 in the depicted embodiment is substantially planar, although it is conceivable that additional embodiments of the bottom surface 36 may be concave, convex, and may include other surface shapes or irregularities. The depicted ice forming cavities 32 are substantially cubed shaped, generally having four sidewall surfaces 60 that extend upward from the bottom surface 36 at locations that are substantially orthogonal relative to each adjacent sidewall surface 60. The sidewall surfaces 60 are interconnected by transition surfaces 62 that form curved corner edges of the ice forming cavity 32. The outermost sidewall surfaces 60 of the ice tray 26 extend upward beyond the ice forming cavities 32 to form an upper ring 64 that surrounds all of the ice forming cavities 32 and thereby defines an upper containment surface 66. Although substantially cubed shaped, each sidewall surface 60 angles outward from the respective bottom surface 36 to allow ice pieces to more easily release from the ice tray 26 during the harvesting cycle, as discussed in more detail herein. The angled sidewall surfaces 60 may also provide advantages in some embodiments of the ice maker 22, whereby the ice tray 26 is rocked in oscillation about the rotational axis 53 to promote clear ice formation, as also described in greater detail herein.

Still referring to FIGS. 5 and 7, the illustrated embodiment of the ice tray 26 is provided with the flexible structure 28 that bounds the lateral sides of each of the ice forming cavities 32, thereby including the sidewall surfaces 60, the transition surfaces 62, and the upper containment surface 66. More specifically, the flexible structure 28 defines a network of walls that interconnect with each other to substantially form the series of ice forming cavities 32. The walls in the illustrated embodiment are defined as exterior sidewalls 68 that surround a periphery of the ice tray 26 and interior sidewalls 70 that interconnect inside of the exterior sidewalls 68 to form the ice forming cavities 32. Several of the interior sidewalls 70 that interconnect linearly to extend along the rotational axis 53 of the ice tray 26 are together referred to as a median wall 72. The median wall 72 divides the two rows of ice forming cavities 32 in the illustrated embodiment, such that in some embodiments, rocking the ice tray 26 about the rotational axis 53 may cause the water in the ice forming cavities 32 to cascade over the median wall 72 for promoting clear ice formation, as described in more detail herein. It is contemplated that the flexible structure 28 in alternative embodiments may include multiple interconnected flexible pieces and may be alternately shaped to define ice forming cavities 32 with different geometric configurations, such as semi-circular shapes, pyramid shapes, and other polygonal shapes. With respect to material properties, the flexible structure 28 may comprise a polymer configured to have a low conductivity relative to the plurality of heat sinks 30. More specifically, the material forming the sidewall surfaces 60 of the ice forming cavities 32 may include an insulated material, including, without limitation, plastic materials, such as polypropylene. In addition to being insulative, the material of the flexible structure 28 may include an elastomeric polymer configured to resiliently twist during the harvest cycle. Furthermore, portions of the sidewall surfaces 60 and/or the interior surface of the ice forming cavities 32 may include a coating, such as a hydrophobic or ice-phobic coating as disclosed in U.S. patent application Ser. No. 13/782,746, filed Mar. 1, 2013, entitled "HEATER-LESS ICE MAKER ASSEMBLY WITH A TWISTABLE TRAY," now U.S. Pat. No. 9,513,045 issued Dec. 6, 2016, which is hereby incorporated by reference in its entirety.

With further reference to FIGS. 5 and 7, the ice forming cavities 32 are partially interconnected by channels 74 formed through the interior sidewalls 70. The channels 74, although capable of being formed as apertures or other types and shapes of conduits, in the illustrated embodiment are provided as narrow slots that allow water in the ice forming cavities 32 to flow into or out of an adjacent ice forming cavity 32 once water in the ice forming cavity 32 receiving water has reached the level of the channel 74 on the respective interior sidewall 70. Therefore, filling each of the ice forming cavities 32 with water may be accomplished by adding or otherwise dispensing water into one of the ice forming cavities 32 and allowing the water to flow to the adjacent cavities 32 until each of the ice forming cavities 32 is filled to the desired level. It is also contemplated that additional embodiments of the ice maker 22 may dispense water to more than one of the ice forming cavities 32, whereby the channels 74 may not be provided between the separate ice forming cavities 32 having dedicated water dispensers. The channels 74 may also increase the flexibility of the flexible structure 28 by decreasing the structural rigidity that would resist twisting about the rotational axis 53.

Figure 6:
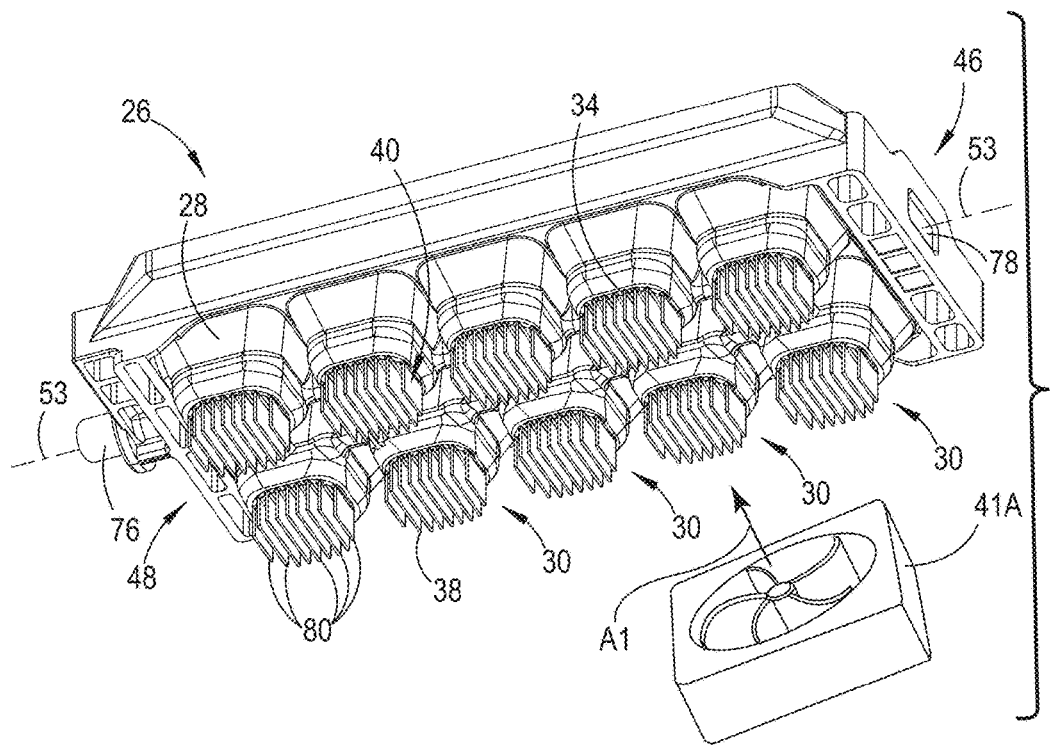
FIG. 6 is a partially schematic bottom perspective view of the ice tray shown in FIG. 5, taken from an opposite end from that shown in FIG. 5.

As shown in FIGS. 5 and 6, the first and second ends 46, 48 of the ice tray 26 are provided with attachment points to permit rotation about the rotational axis 53. The second end 48 of the ice tray 26, as shown in FIG. 5, includes an axle member 76 that protrudes integrally away from the ice forming cavities 32 concentrically with the rotational axis 53. The axle member 76 is located centrally between the exterior sidewalls 68 and in substantial alignment with the median wall 72. The axle member 76 is configured to rotatably engage the bearing aperture 50 in the second end wall 52 of the housing 42 of the ice maker 22 (FIG. 4). It is contemplated that additional embodiments of the axle member may be a separate piece from the ice tray 26 and may be fixedly coupled therewith, and it is conceivable that additional embodiments of the ice maker housing 42 may be provided with an axle member extending into the interior volume from the second end wall 52 of the ice maker and, thereby, the second end 48 of the ice tray 26 may be provided with a corresponding bearing aperture for rotatably engaging such an axle member.

The opposing first end 46 of the ice tray 26, as illustrated in FIG. 6, is similarly provided with an attachment point to permit rotation of the ice tray 26 about the rotational axis 53. More specifically, the first end 46 of the ice tray 26 includes a non-circular aperture 78 configured to fixedly and matingly engage a corresponding non-circular end of a rotor shaft of the harvest motor 24. The depicted embodiment includes a substantially rectangular shaped aperture positioned on the first end 46 to align the drive axis of the rotor shaft with the rotational axis 53 of the ice tray 26, including alignment with the axle member 76 on the second end 48 of the ice tray 26. It is also conceivable that the first end 46 of the ice tray 26 in additional embodiments may include an axle member or a circular aperture that would allow for an alternative operable connection with the rotor shaft of the harvest motor 24 to permit rotation of the ice tray 26 in a similar manner.

Figure 8:
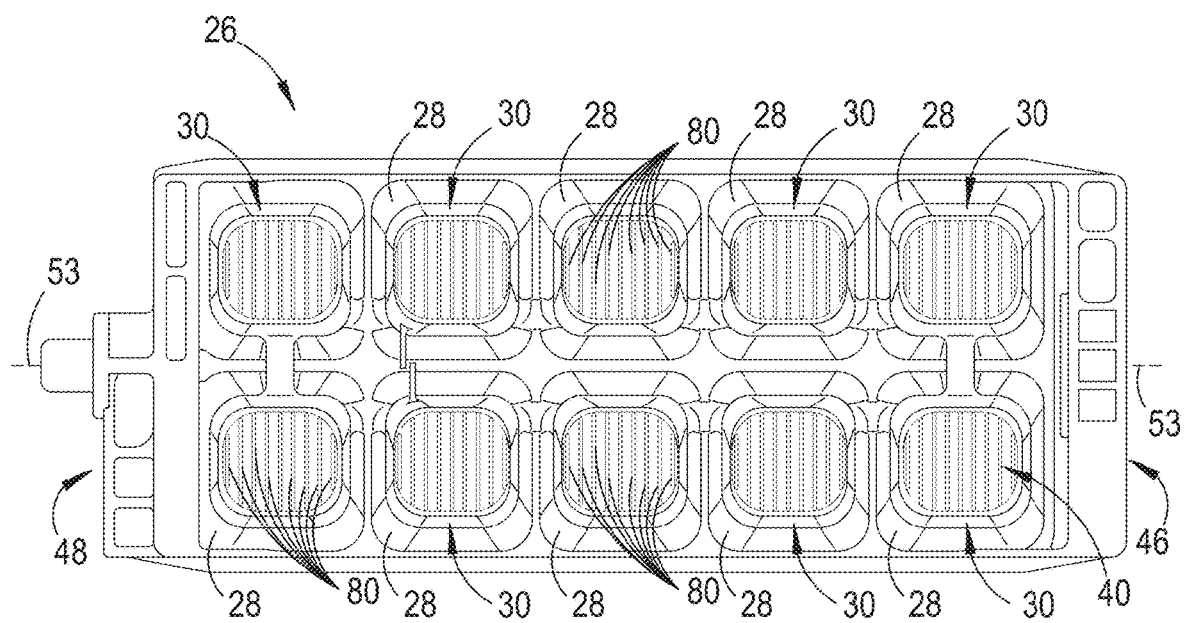
FIG. 8 is a bottom plan view of the ice tray shown in FIG. 5.

Referring to FIGS. 6 and 8, the illustrated embodiment of the ice tray 26 includes each of the plurality of heat sinks 30 coupled to a single cavity of the discrete ice forming cavities 32, so that each ice forming cavity 32 has a dedicated heat sink 30 forming the bottom surface 36 of the ice forming cavity 32. The dedicated heat sinks 30 increase the rate of freezing of liquids in the ice cavities and are separately provided on each ice forming cavity 32 to not restrict and not substantially restrict twisting and flexing of the flexible structure 28 of the ice tray 26 to release ice pieces therein. One of the heat sinks 30 is thereby separate from at least one other heat sink 30 on the ice tray 26, and more preferably each heat sink 30 is dedicated to an individual ice forming cavity 32 to allow the greatest amount of flexing naturally permitted by the material and construction of the flexible structure 28 of the ice tray 26 upon twisting. The lower portion 38 of each of the heat sinks 30 includes at least one heat dissipation member 40 protruding away from the upper portion 34, which defines the bottom surface 36 of at least one of the ice forming cavities 32. The heat dissipation member 40 shown in the illustrated embodiment includes a series of fins 80 that protrude downward from the upper portion 34 for conductively transferring heat away from the bottom surface 36 of the respective ice forming cavity 32 to air surrounding the series of fins 80. In the depicted embodiment, the series of fins 80 are substantially planar, aligned in parallel relationship to each other, and protruding orthogonally from the substantially horizontal upper portion 34 of the respective heat sink 30. Further, the illustrated heat sinks 30 are positioned relative to each other on the ice forming cavities 32 to align the fins 80 of each heat sink 30 in perpendicular orientation relative to the rotational axis 53 of the ice tray 26. By aligning the fins 80 of the heat sinks 30, air flow in a single direction may more easily pass through and between the fins 80, thereby more efficiently dissipating heat away from the bottom surface 36. It is contemplated that the heat dissipation member 40 may include more or fewer fins 80, alternatively shaped fins or other members, and fins or other members protruding in different orientations from the upper portion 34 of the respective heat sink 30.

Referring to FIG. 6, an electrically powered fan 41A may be utilized to direct airflow in the direction of arrow A1. Fins 80 of ice tray 26 are generally transverse (e.g., perpendicular) to rotational axis 53. Air flow parallel to the fins 80 (in the direction of arrow A1) carries heat away from the fins 80 to thereby promote rapid freezing of water disposed in cavities 32. The fluid flow may comprise fluid flow in the direction of arrow A1. The fan 41A may be mounted to housing 42 or other structure of ice maker 22.

Figure 6A:
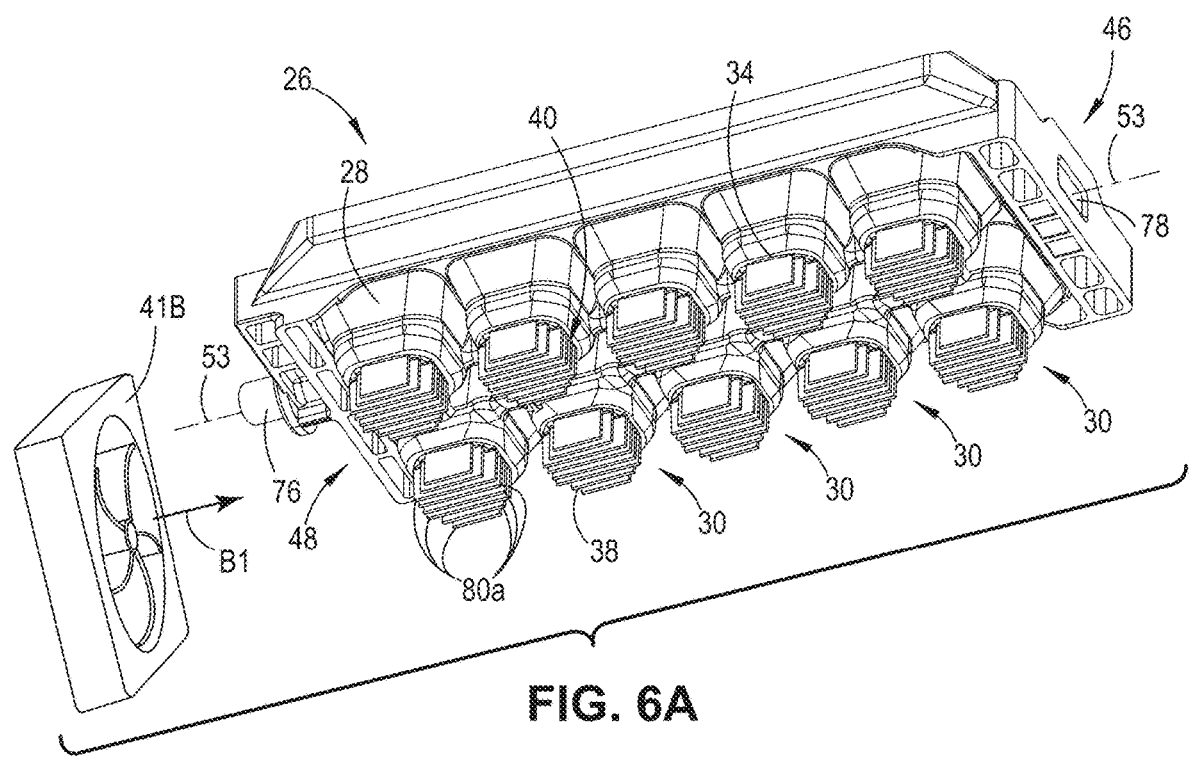
FIG. 6A is a partially schematic bottom perspective view of an ice tray according to another aspect of the present disclosure.

The fins 80a may also be parallel to axis 53. Specifically, ice tray 26 may include fins 80a that are generally parallel to rotational axis 53 as shown in FIG. 6A. An electrically powered fan 41B directs fluid (air) flow in the direction of arrow B1. Specifically, ice tray 26 may include fluid flow parallel to fins 80a to carry heat away from fins 80a. Fan 41B may comprise a component of ice maker 22, and may be mounted to housing 42 or other structure.

As further illustrated in FIG. 9, the plurality of heat sinks 30 are exploded away from the flexible structure 28 of the ice tray 26, exposing an upward protruding flange 82 that surrounds the upper portion 34 of each heat sink 30. The upward protruding flange 82 is configured to engage the flexible structure 28 around the respective ice forming cavity 32. The upward protruding flange 82 extends from an edge of a substantially planar and horizontal surface of the heat sink 30 that defines the bottom surface 36 of the ice forming cavity. Accordingly, the upward protruding flange 82 extends from the bottom surface 36 in substantial alignment with the sidewall surfaces 60 of the respective ice forming cavity 32, but substantially outside the sidewall surfaces 60 to allow material to encase the upward protruding flange 82 when it is embedded in the sidewalls 68, 70. The upward protruding flange 82, in the illustrated embodiment, also includes at least one engagement feature 84 to assist in retaining the respective heat sink 30 to the flexible structure 28. The engagement feature 84 may include various forms of protrusions, apertures, adhesives, and/or fasteners configured to engage the heat sink 30 to the flexible structure 28.

Two different embodiments of a heat sink 30 are illustrated in FIGS. 10 and 10A, depicting different forms of engagement features 84 integrally formed on the heat sink 30. As shown in FIG. 10, one embodiment of the engagement feature includes an aperture 86 formed through the upward protruding flange 82 in four locations spaced equally around the edge of the bottom surface 36. The apertures 86 have a substantially circular shape and extend between an inner surface 88 of the upward protruding flange 82 and an outer surface 90 of the upward protruding flange 82 to allow injection molded material of the flexible structure 28 to flow into the aperture 86 and, prior to solidification, interconnect material abutting the inner surface 88 and material abutting the outer surface 90 of the upward protruding flange 82. It is also contemplated that the additional embodiments of flexible structure of the ice tray 26 may be formed to have a protrusion that is aligned for snap-fitting into engagement with such an aperture 86 upon inserting the upward protruding flange 82 into or onto a corresponding mating feature on the bottom portion of such a flexible structure, thereby similarly securing the heat sinks 30 around each of the ice forming cavities 32. It will be understood that the engagement features such as apertures 56 are optional, and flange 82 may comprise a substantially continuous structure that is free of apertures or other openings.

Another embodiment of the engagement feature 84 is shown in FIG. 10A, similar to the aperture 86 shown in FIG. 10, but a narrow passage 92 is formed in the upward protruding flange 82 that extends down from a top edge 94 of the upward protruding flange 82 to merge with an aperture 96 in forming a tear-shaped notch 98. Similar to the aperture 86, the notch 98 allows material to interconnect between the inner and outer surfaces 88, 90 of the upward protruding flange 82 or otherwise to frictionally engage a preexisting protrusion on the flexible structure 28. The embodiment of the engagement feature 84 depicted in FIG. 10A provides the narrow passage 92 with a smaller width proximate the top edge 94 of the upward protruding flange 82 than the interconnecting aperture 96 having a larger width to define the tear-shaped notch 98. The larger width of the aperture assists in retaining the material of the flexible structure 28 in securing the heat sink 30 to the ice tray 26. It is contemplated that additional, fewer and differently shaped notches and/or apertures may be provided on the upward protruding flange 82 in other embodiments of the heat sink 30.

As further illustrated in FIGS. 10 and 10A, the outer surface 90 of the upward protruding flange 82 includes another embodiment of an engagement feature 84, which is depicted as three retention ribs 100 that surround the outer surface 90 of the upward protruding flange 82. The retention ribs 100 are included to provide an additional feature for the injection molded material of the flexible structure 28 to engage for enhancing the connection between the heat sinks 30 and the flexible structure 28. In other embodiments the retention ribs 100 may be segmented or otherwise provided with different shapes and configurations to protrude from the inner and/or outer surfaces 88, 90 of the upward protruding flange 82 for forming a sufficient connection.

Figure 11:
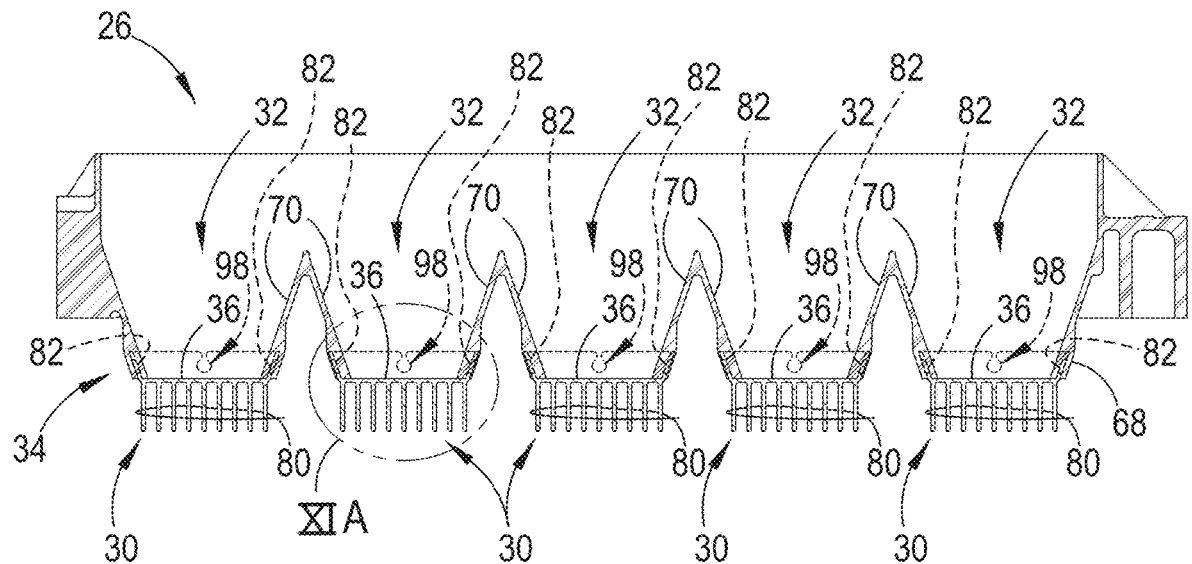
FIG. 11 is a cross-sectional view of the ice tray, taken at line XI-XI of FIG. 7.
Figure 11A:
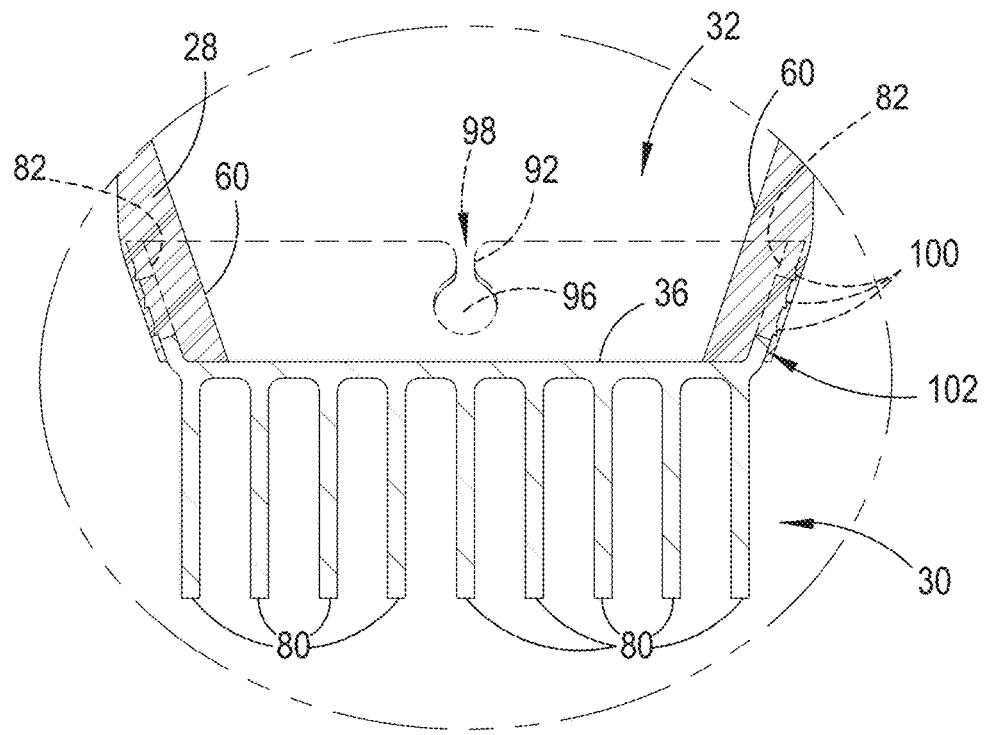
FIG. 11A is an enlarged view of a portion of the cross section shown in FIG. 11, taken at section XIA, illustrating a heat sink of the ice tray.
Figure 12:
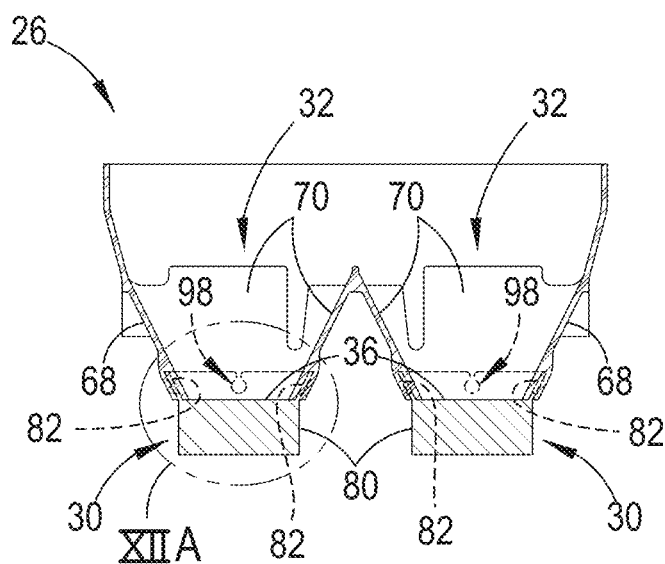
FIG. 12 is a cross-sectional view of the ice tray, taken at line XII-XII of FIG. 7.
Figure 12A:
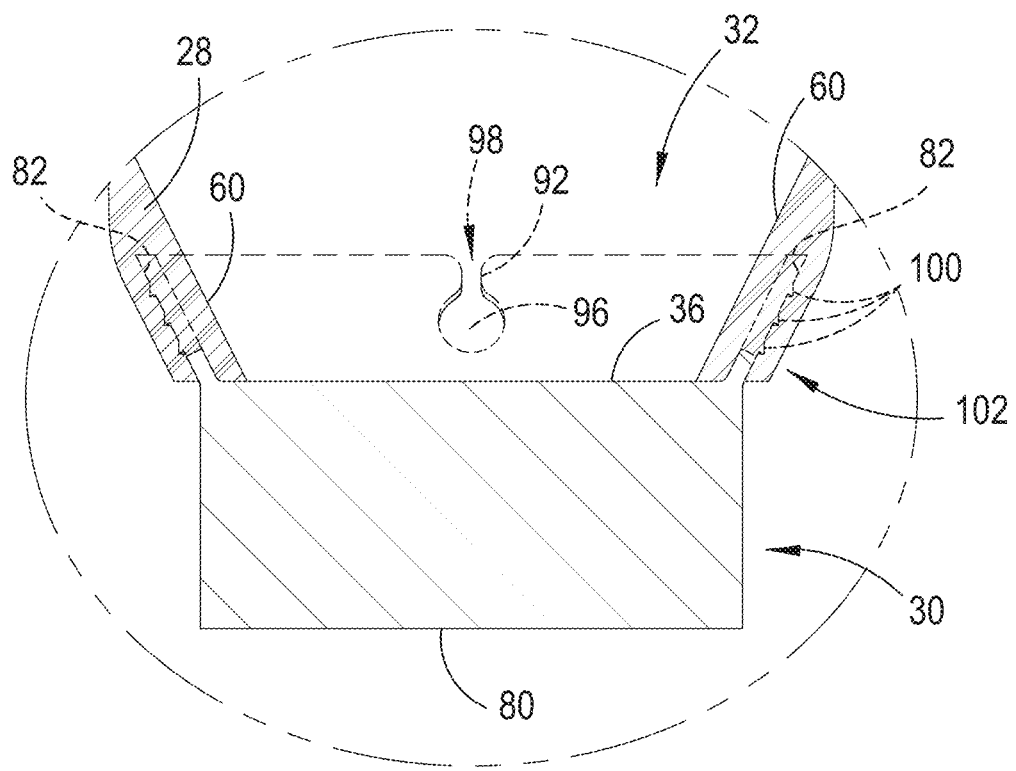
FIG. 12A is an enlarged view of a portion of the cross section shown in FIG. 12, taken at section XIIA, illustrating a heat sink of the ice tray.

The illustrated embodiment of the ice tray 26 shown in FIGS. 11-12A depicts the flexible structure 28 injection molded over a peripheral edge 102 of the upper portion 34 of each of the plurality of heat sinks 30 to define a seal between the bottom surfaces 36 of the ice forming cavities 32 and the sidewalls 68, 70 of the ice forming cavities 32. The formation of the seal between the sidewalls 68, 70 and the heat sink 30 is configured to retain water that comes into contact and accumulates on the upper portion 34 of the heat sink 30. The flange 82 that surrounds the peripheral edge 102 of each of the plurality of heat sinks 30 may be segmented in additional embodiments or otherwise consistent as shown in FIG. 10. To provide an adequate seal between the flexible structure 28 and the heat sinks 30, additional material of the flexible structure 28 may be provided around the upward protruding flange 82 on the heat sinks 30 increasing the thickness of the sidewalls 68, 70 around the upward protruding flange 82 relative to the material provided along the interior walls 70 that define the upper sections of the ice forming cavities 32.

Figure 11B:
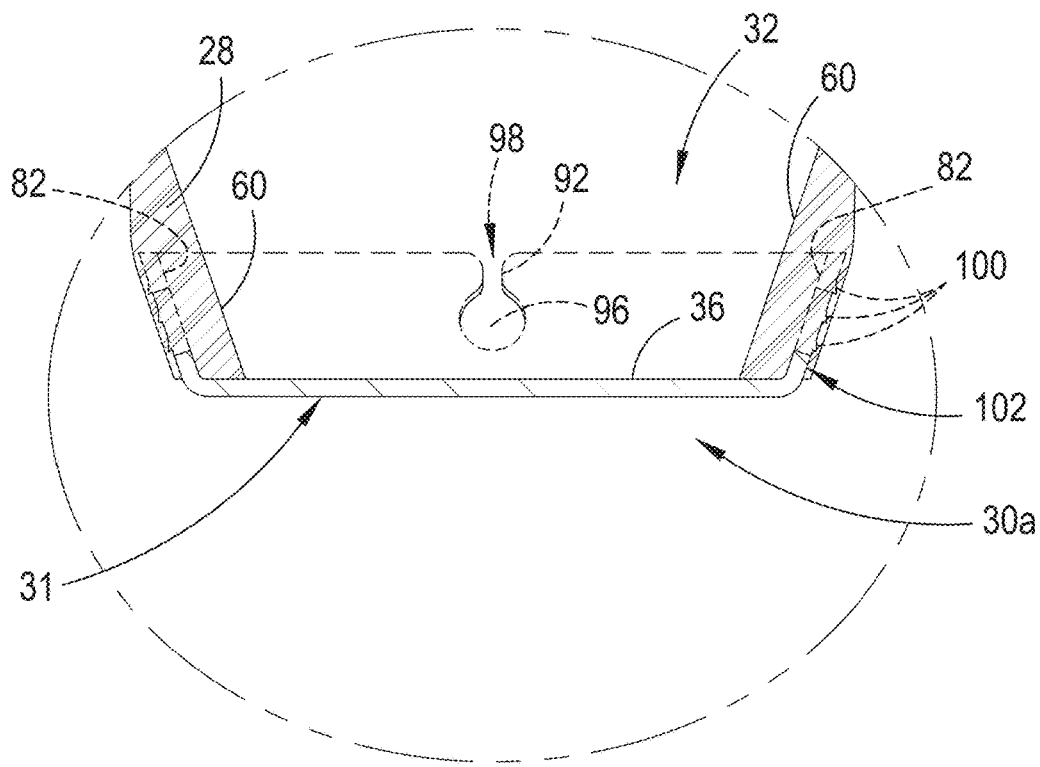
FIG. 11B is an enlarged view of a heat sink according to another aspect of the present disclosure.

Referring to FIG. 11B, a heat sink 30a according to another aspect of the present disclosure, does not include fins, but rather has a bottom surface 31 that is substantially smooth and planar. Bottom surface 31 may, alternatively, be concave, convex, and may include other surface shapes or irregularities.

Figure 11C:
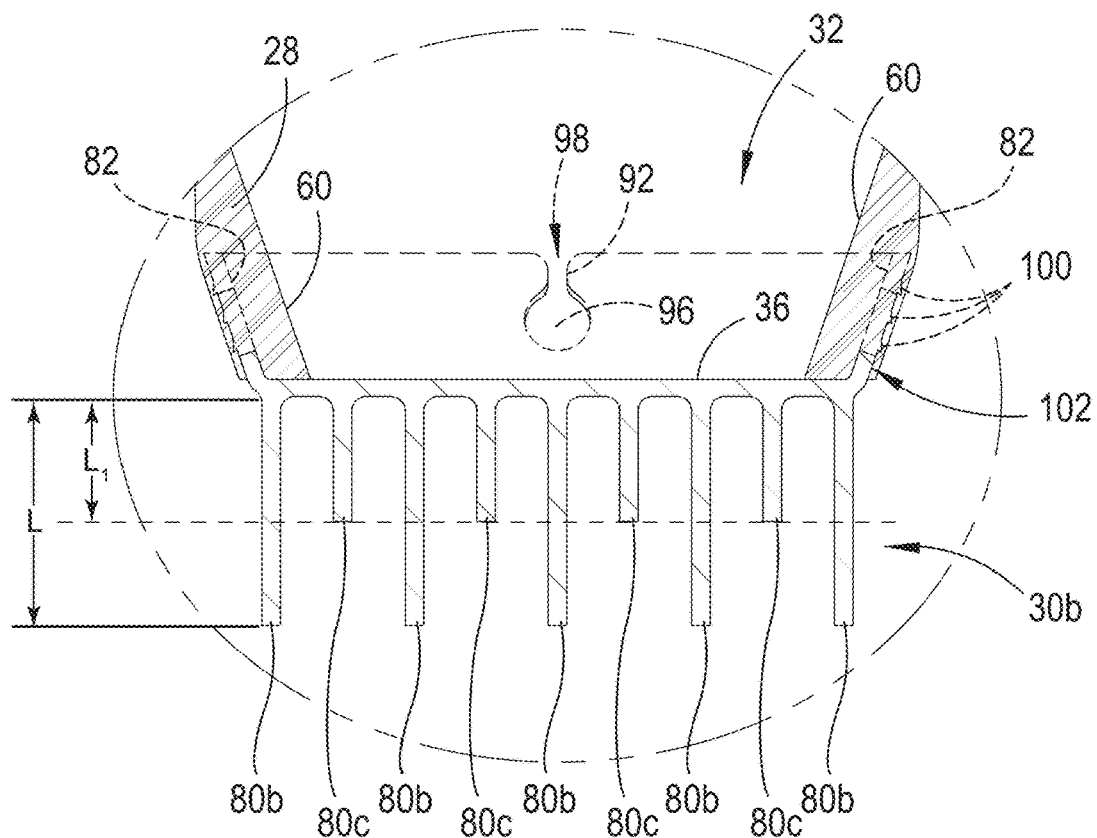
FIG. 11C is an enlarged view of a heat sink according to another aspect of the present disclosure.

Referring to FIG. 11C, a heat sink 30b according to another aspect of the present disclosure includes a plurality of longer fins 80b that are substantially similar to fins 80. Heat sink 30b also includes a plurality of shorter fins 80c. Longer fins 80b and shorter fins 80c may be arranged in an alternating manner as shown in FIG. 11C. However, virtually any suitable configuration may be utilized as shown in FIG. 11C, longer fins 80b may have a length L and shorter fins 80c may have a length $L_1$. Fins 80b and 80c may be arranged in various orientations, lengths (L, $L_1$, etc.), and sizes to provide heat transfer from water in ice forming cavity 32. Length L may be about twice the length $L_1$. For example, length L may be about 1-2 cm, and length $L_1$ may be about 0.5-1 cm. It will be understood that the notches 98 of FIGS. 11B and 11C are optional.

Figure 13:
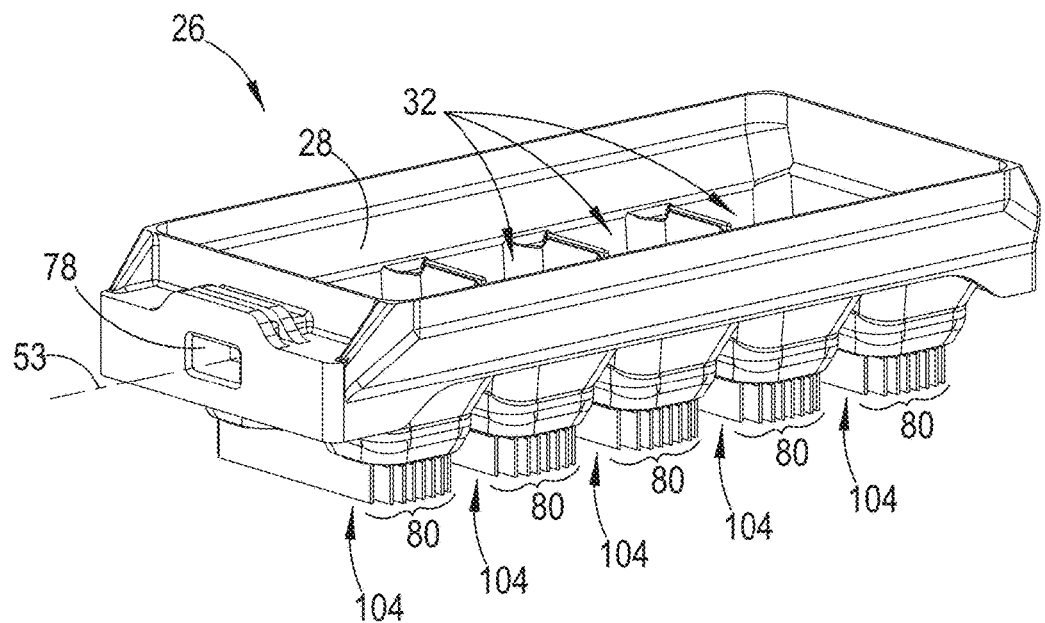
FIG. 13 is a top perspective view of an additional embodiment of an ice tray, having heat sinks that span laterally between separate ice forming cavities.
Figure 14:
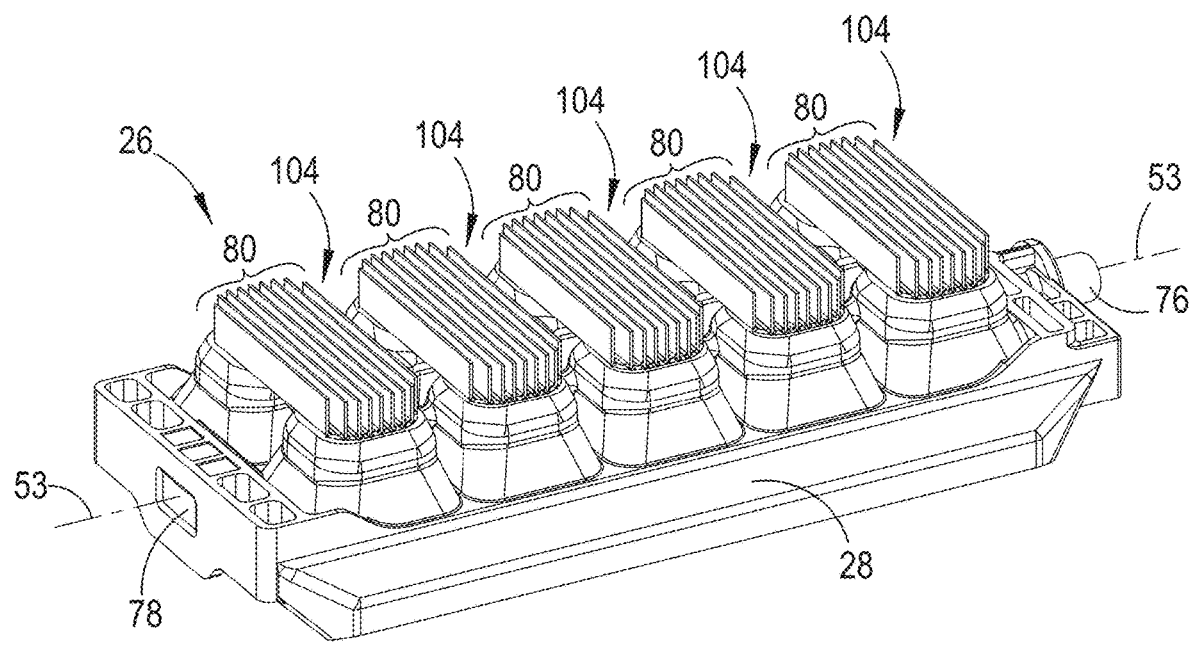
FIG. 14 is a bottom perspective view of the additional embodiment of the ice tray shown in FIG. 13.

An additional embodiment of an ice tray 26 is shown in FIGS. 13 and 14, having heat sinks 104 that span between more than one ice forming cavity 32. As shown, the heat sinks 104 span laterally across the rotational axis 53 thereby defining the bottom surface 36 of two laterally adjacent ice forming cavities 32. These heat sinks 104 are also capable of moving relative to each other upon twisting of the flexible structure 28 to release ice pieces from the ice tray 26. As exemplified with this embodiment, the heat sinks in additional embodiments of the ice tray 26 may span beyond a single ice forming cavity 32 to couple with other ice forming cavities 32 or portions thereof. However, it is preferable for an embodiment of the ice tray 26 configured to twist for ice harvesting to include at least two separate heat sinks to permit twisting of the ice tray 26, although the separate heat sinks may be pivotally or otherwise moveably coupled to each other.

Figure 15:
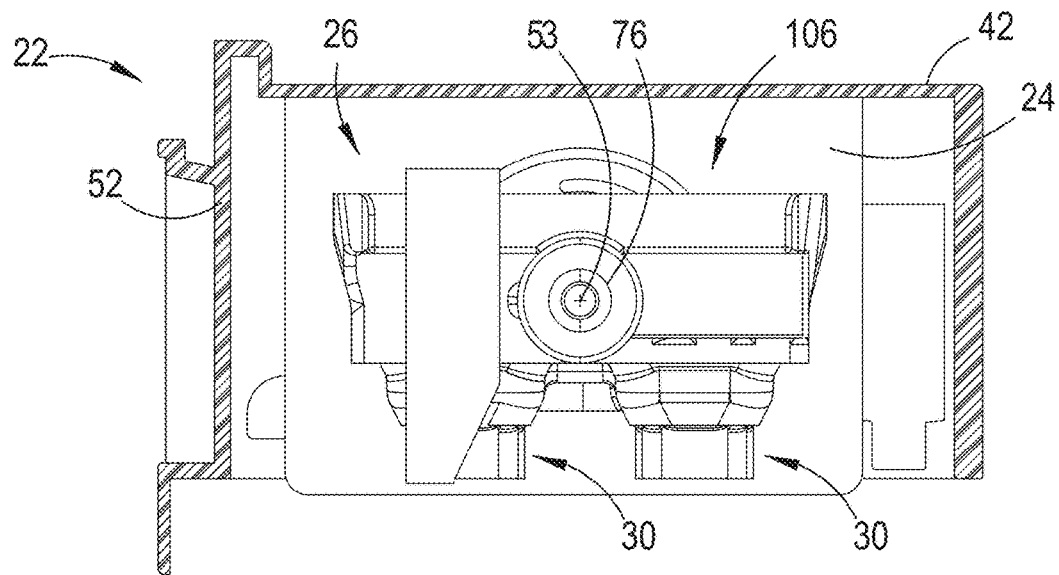
FIG. 15 is an end view of the ice tray in the home position relative to the ice maker housing.
Figure 15A:
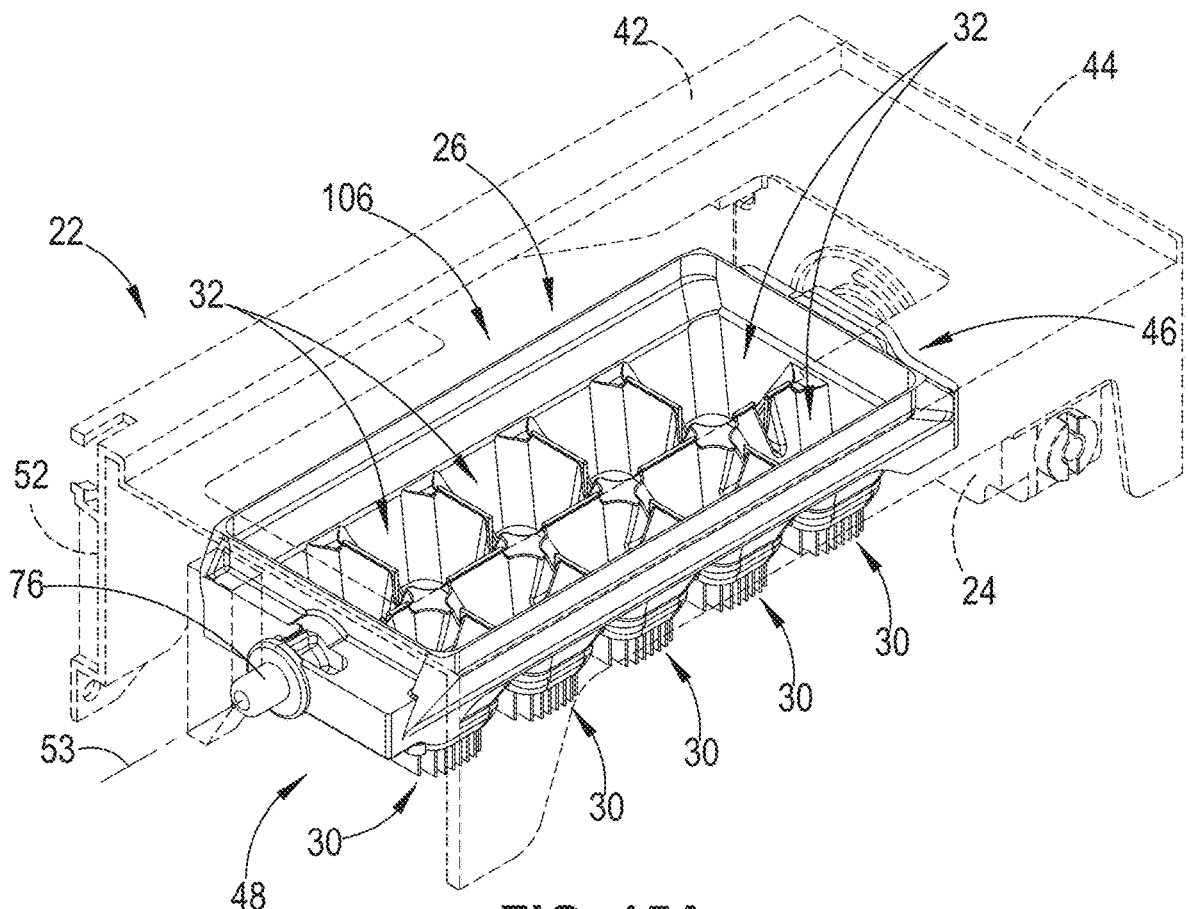
FIG. 15A is a top perspective view of the ice tray shown in FIG. 15.

Referring to FIGS. 15-17A, operation of the ice maker 22 is shown according to one embodiment. It is contemplated that the ice maker 22 is operated by an electrical control unit or controller, either dedicated to the ice maker 22 or otherwise integrated with another controller, such as the general control circuitry of the corresponding appliance. In FIGS. 15-15A the ice tray 26 is positioned horizontally in a home position 106 to allow water to be dispensed into the ice forming cavities 32. As water is dispensed into one of the ice forming cavities 32, the water accumulates in that filling cavity 32 until the top surface exceeds the height of the channels 74 that interconnect the filling cavity 32 into other ice forming cavities 32 on the ice tray 26. Water then is permitted to communicate from the filling ice forming cavity 32 to the adjacent ice forming cavities 32, and then water is accumulated in those adjacent ice forming cavities until either the water is further distributed to the next sequential ice forming cavity 32 or until all the ice forming cavities 32 are filled to the desired level, such as a fill level below the top surfaces of the interior walls 70.

Figure 16:
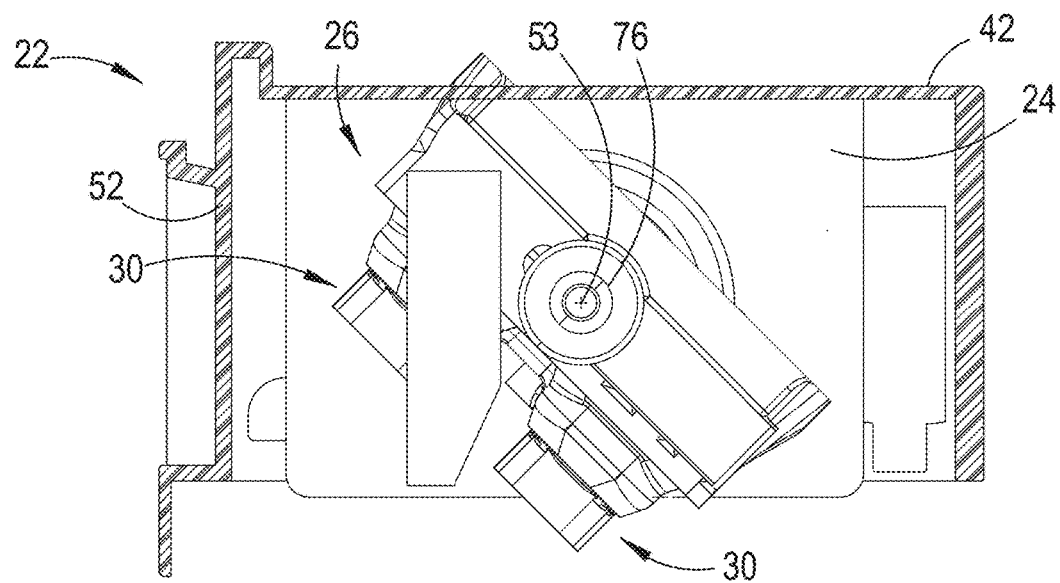
FIG. 16 is an end view of the ice tray in the rocked position relative to the ice maker housing.
Figure 16A:
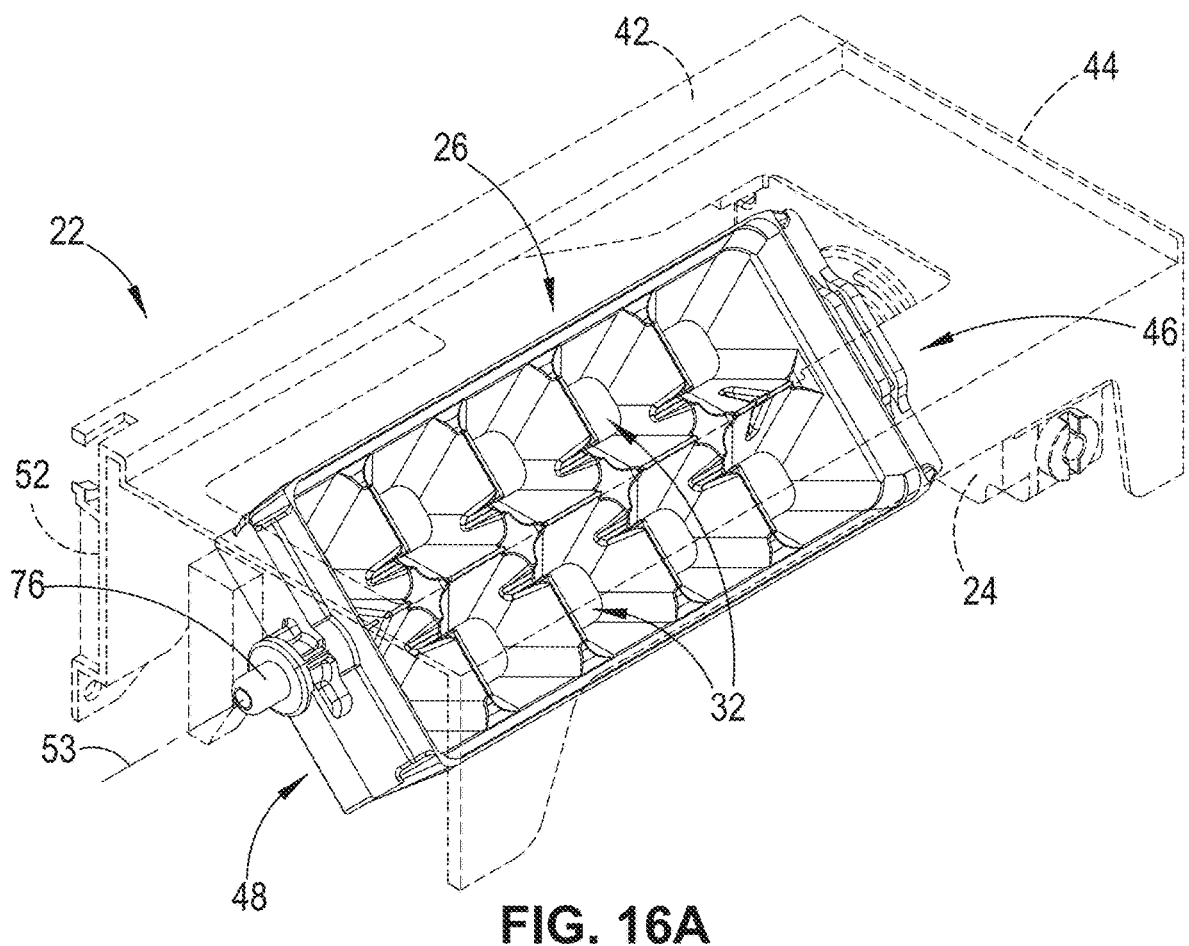
FIG. 16A is a top perspective view of the ice tray shown in FIG. 16.

As shown in FIGS. 16-16A the ice tray 26 is rotated to an angle that will allow the water to move in the ice forming cavities 32, if not already frozen. From such a tilted angle, the ice tray 26 may then be rotated in the opposite direction to an opposing tilted angle, which may then be repeated to oscillate the ice tray 26 in a rocking motion. Rocking the ice tray 26 is an optional processing technique that may be done with the ice maker 22 while water is freezing in the ice forming cavities to prevent the upper surface of the water from freezing before the remaining water, thereby promoting clear ice formation with the ice maker 22.

Figure 17:
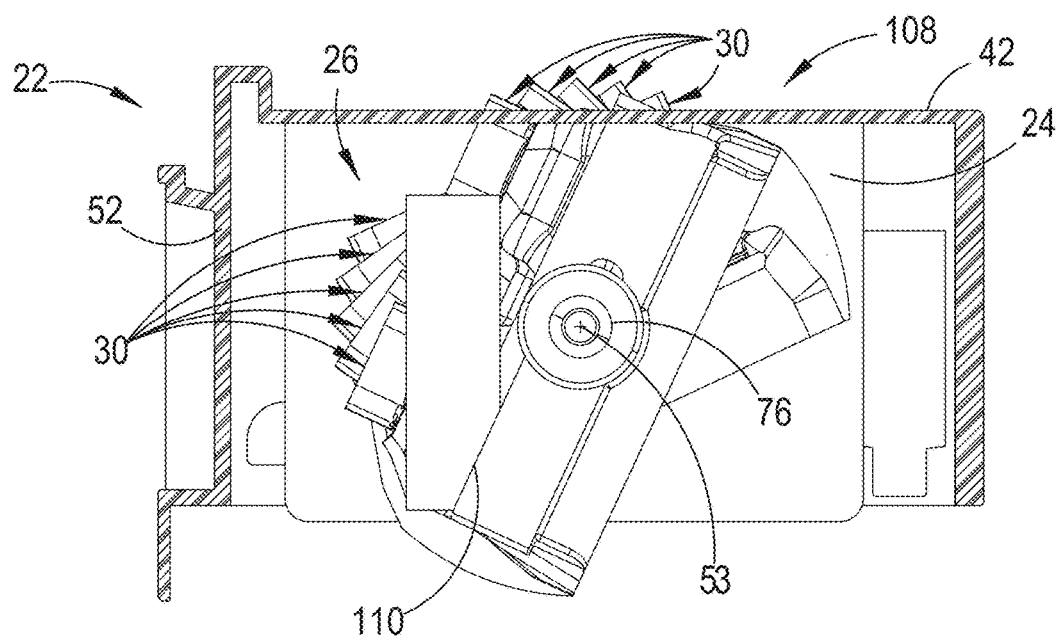
FIG. 17 is an end view of the ice tray shown in a twisted position relative to the ice maker housing.
Figure 17A:
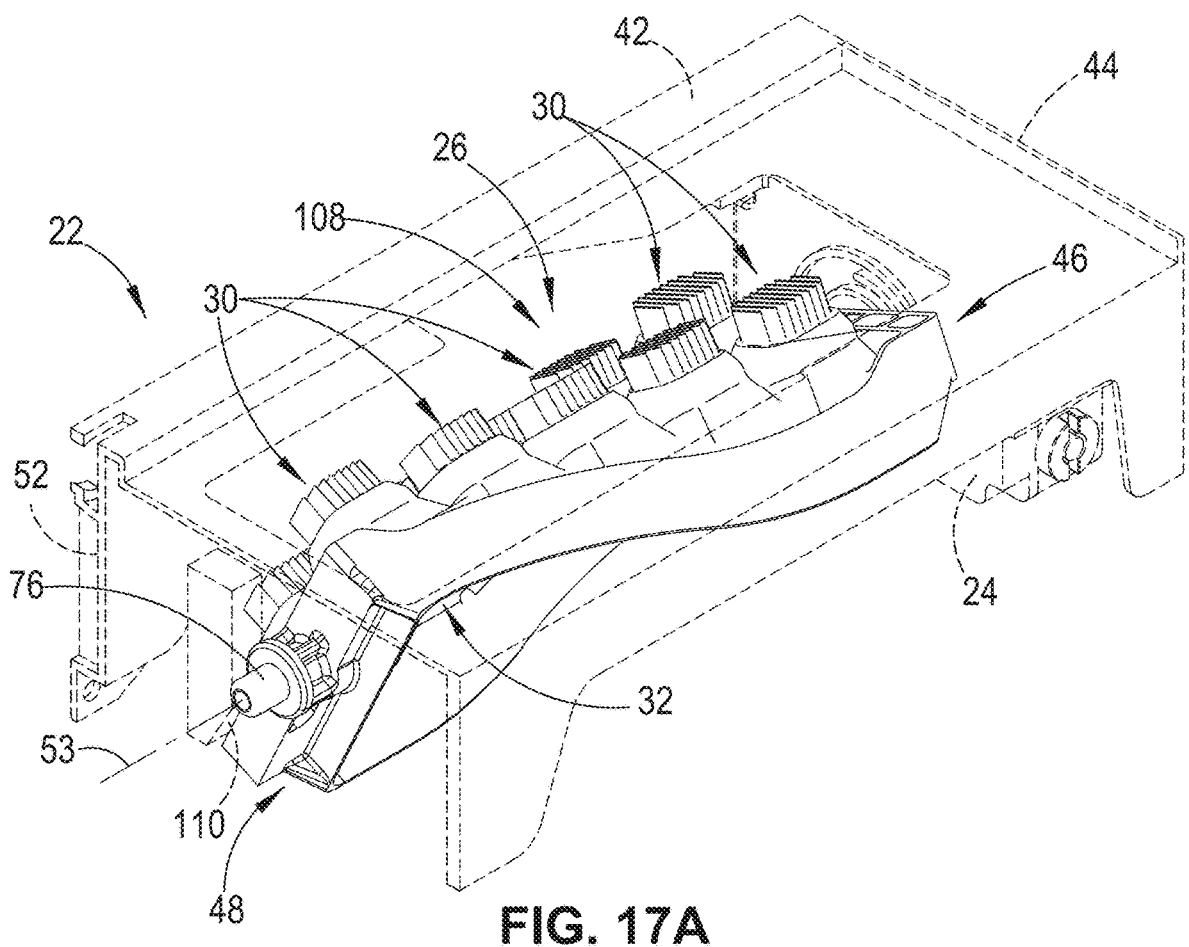
FIG. 17A is a top perspective view of the ice tray shown in FIG. 17.

Once the water has substantially frozen to form ice pieces in the ice forming cavities 32, as shown in FIGS. 17-17A, the ice maker 22 may operate a harvest cycle. The harvest cycle commands the harvest motor 24 to rotate the ice tray 26 about the rotational axis 53 to an inverted position 108, whereby some of the ice pieces may fall out of the ice forming cavities 32 due to gravity. For the ice pieces that remain lodged in the ice forming cavities 32, the harvest motor 24 may continue to apply torque to the first end 46 of the ice tray 26 while the second end 48 abuts a catch 110 on the second end wall 52 of the ice maker housing 42, causing the flexible structure 28 of the ice tray 26 to twist. More specifically, the catch 110 abuts a protrusion on the second end 48 of the flexible structure 28 of the ice tray 26 adjacent to the axle member 76. The twisting of the ice tray 26 occurs in the flexible structure 28 generally about the rotational axis 53, which slightly distorts the sidewalls 68, 70 and causes the ice pieces to dislodge and release from the ice forming cavities 32. The twisting of the flexible structure 28 is easily permitted due to the separation of the plurality of heat sinks 30, which move relative to each other during the twisting motion. It is contemplated that the twisting motion may also be accomplished in additional embodiments of the ice maker 22 by rotating the ice tray 26 in an opposite direction from that illustrated, additionally or alternatively rotating the ice tray from the opposite end, and/or twisting the ice tray in an oscillating or repeated cycle.

The heat sinks 30, 30a, and 30b may be aluminum or other suitable material. In general, aluminum heat sinks 30, 30a, and/or 30b and the flexible structure 28 are coupled together to form ice tray 26. The aluminum heat sinks 30, 30a, and/or 30b and the flexible structure 28 are coupled in a manner that forms a seal that remains intact when the ice tray 26 is twisted. The aluminum heat sinks 30, 30a, and/or 30b conduct heat away from the water within the ice forming cavities 32 of the ice tray 26 by drawing heat away from the water at the bottom surface 36 of the ice forming cavities 32. The flexible structure 28 may be formed of a flexible material (for example, a polymer) that may have relatively low thermal conductivity that limits heat transfer from the water to the flexible structure 28. The use of relatively rigid aluminum heat sinks 30, 30a, and/or 30b coupled to a flexible polymer structure 28 provides both increased heat transfer for rapid ice formation and ice tray flexibility that allows ice cubes to be readily removed.

Referring to FIGS. 18-23, an ice tray 26a may include heat sinks 30 with exposed surface areas 120a-120c having various sizes and/or configurations. Like previously described and shown with reference to ice tray 26, the ice tray 26a may have a flexible structure 28 and a plurality of heat sinks 30 coupled to a bottom section of discrete ice forming cavities 32 on the ice tray 26a. As previously explained, the fan 41A may be mounted to housing 42 or other structure of the ice maker 22. An exposed surface area 120 may refer to a surface area of a heat sink 30 that is configured to be exposed to airflow from electrically powered fan 41B or 41A. One or more heat sinks 30a may include an exposed surface area 120a. Exposed surface area 120a may be substantially smooth and planar. Alternatively, the exposed surface area 120a may be concave, convex, and may include other surface shapes and irregularities. One or more heat sinks 30c may include three downward extending fins 80. Heat sink 30c may include an exposed surface area 120b. One or more heat sinks 30d may include six downward extending fins 80. Heat sink 30d may include an exposed surface area 120c. As such, the exposed surface area 120a of a heat sink 30a is less than the exposed surface area 120b of a heat sink 30b. The exposed surface area 120b of a heat sink 30c is less than the exposed surface area 120c of a heat sink 30d. The equation $q=hA(T_1-T_2)$ generally provides the overall heat transfer rate from the heat sinks 30 to the airflow. The variables in the equation $q=hA(T_1-T_2)$ may be defined as follows: h is the heat transfer coefficient of the heat sink material, A is the surface area where the heat transfer takes place, $T_2$ is the temperature of the surrounding fluid (airflow), and $T_1$ is the temperature of the solid surface (exposed surface area 120 of heat sink 30).

Figure 18:
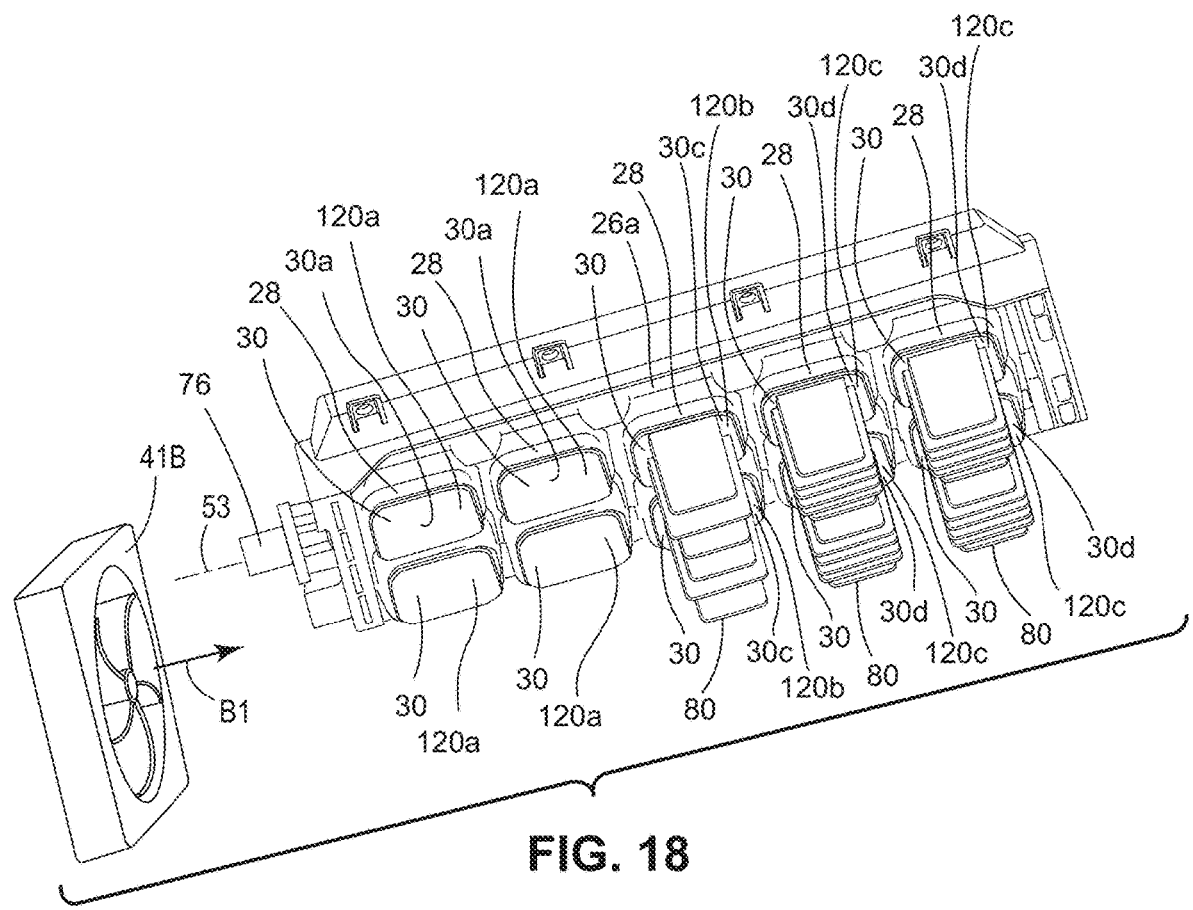
FIG. 18 is a perspective view of an ice tray according to another aspect of the present disclosure.
Figure 19:
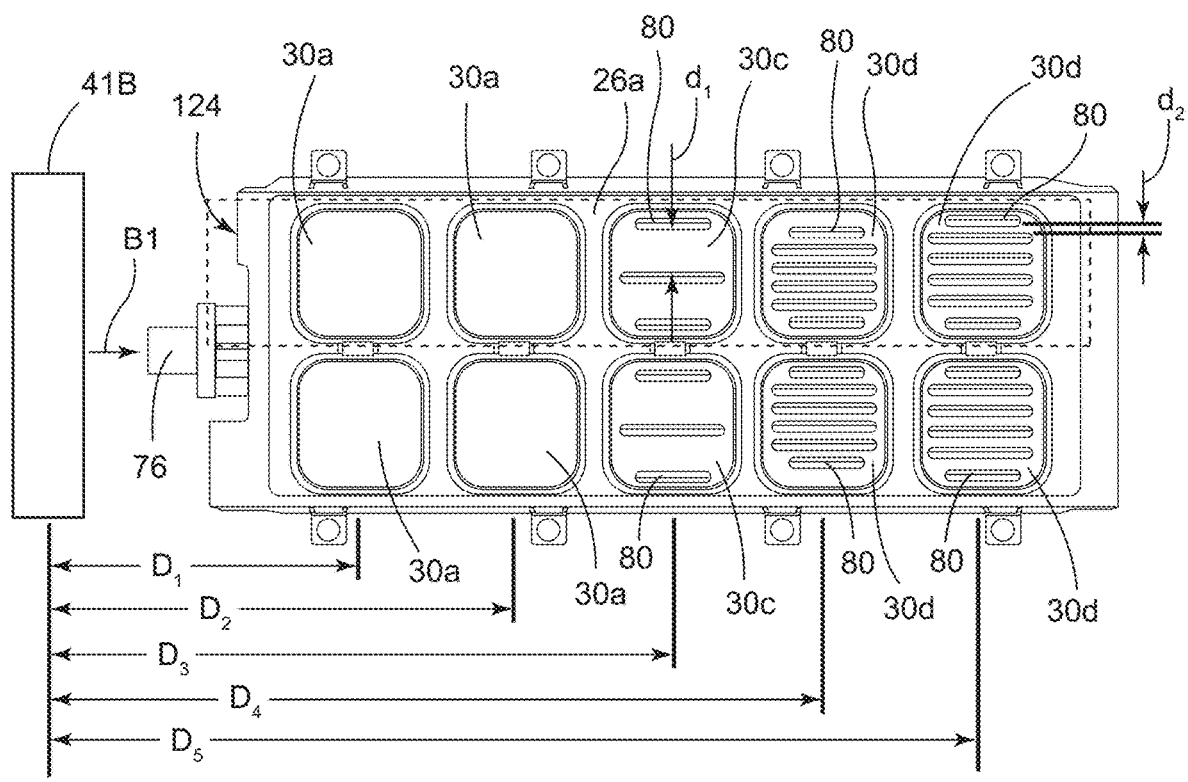
FIG. 19 is a bottom plan view of the ice tray of FIG. 18.

With reference to FIGS. 18 and 19, the heat sinks 30a, 30c, 30d may be arranged so that the exposed surface areas (120a, 120b, 120c) of each of the heat sinks 30 (including heat sinks 30a, 30c, 30d) progressively increase as a distance ($D_1$, $D_2$, $D_3$, $D_4$, $D_5$) from the electrically powered fan 41B of each of the of the heat sinks 30 progressively increases.

Each heat sink 30 shown in FIGS. 18-23 may include an upward protruding flange 82, as previously described and shown in the specification and figures. The ice tray 26a may be molded and/or otherwise formed around the heat sinks 30 shown in FIGS. 18-23 in substantially the same manner as previously described and shown in the specification and figures. Additionally, the ice tray 26a shown in FIGS. 18-23 may function in substantially the same ways as the ice tray 26 previously described and shown in the specification and figures. That is, the ice tray 26a shown in FIGS. 18-23 may operate as previously described and shown during the ice formation, ice harvesting, and other ice maker 22 functions.

With continued reference to FIGS. 18 and 19, heat sinks 30 may be disposed at progressive distances from electrically powered fan 41B. Heat sinks 30a may be disposed at distances $D_1$, $D_2$ from electrically powered fan 41B. Heat sinks 30c may be disposed at distance $D_3$ from the electrically powered fan 41B. Heat sinks 30d may be disposed at distances $D_4$ and $D_5$ from electrically powered fan 41B. The heat sinks 30a, 30c, 30d may be positioned in a substantially linear arrangement 124 parallel to the axle member 76 of the ice maker 22.

With reference to FIGS. 18 and 19, during the ice forming process, the heat sinks 30a, 30c, 30d transfer heat from the water 122 undergoing ice formation (FIG. 23) in the ice forming cavities 32 to the airflow from the electrically powered fan 41B in the direction shown by arrow B1. To aid the transfer of heat from the water 122 undergoing ice formation in ice forming cavities 32 to the airflow, it may be advantageous to minimize airflow obstructions along the airflow path. Airflow may flow along the exposed surface areas 120a of the heat sinks 30a. Air may flow around the downward extending fins 80 of heat sinks 30c and 30d. To reduce or minimize the obstruction of airflow along heat sinks 30c and 30d, the fins 80 of heat sinks 30c and 30d may be arranged parallel to the airflow direction B1. Additionally, to further reduce or minimize obstruction of airflow along heat sinks 30*c* and 30*d*, the distance d₁ between fins 80 of heat sinks 30*c* may be less than the distance d₂ between fins 80 of heat sinks 30*d*. Heat sinks 30*c* may include three downward extending fins 80. Heat sinks 30*d* may include six downward extending fins 80.

Figure 23:
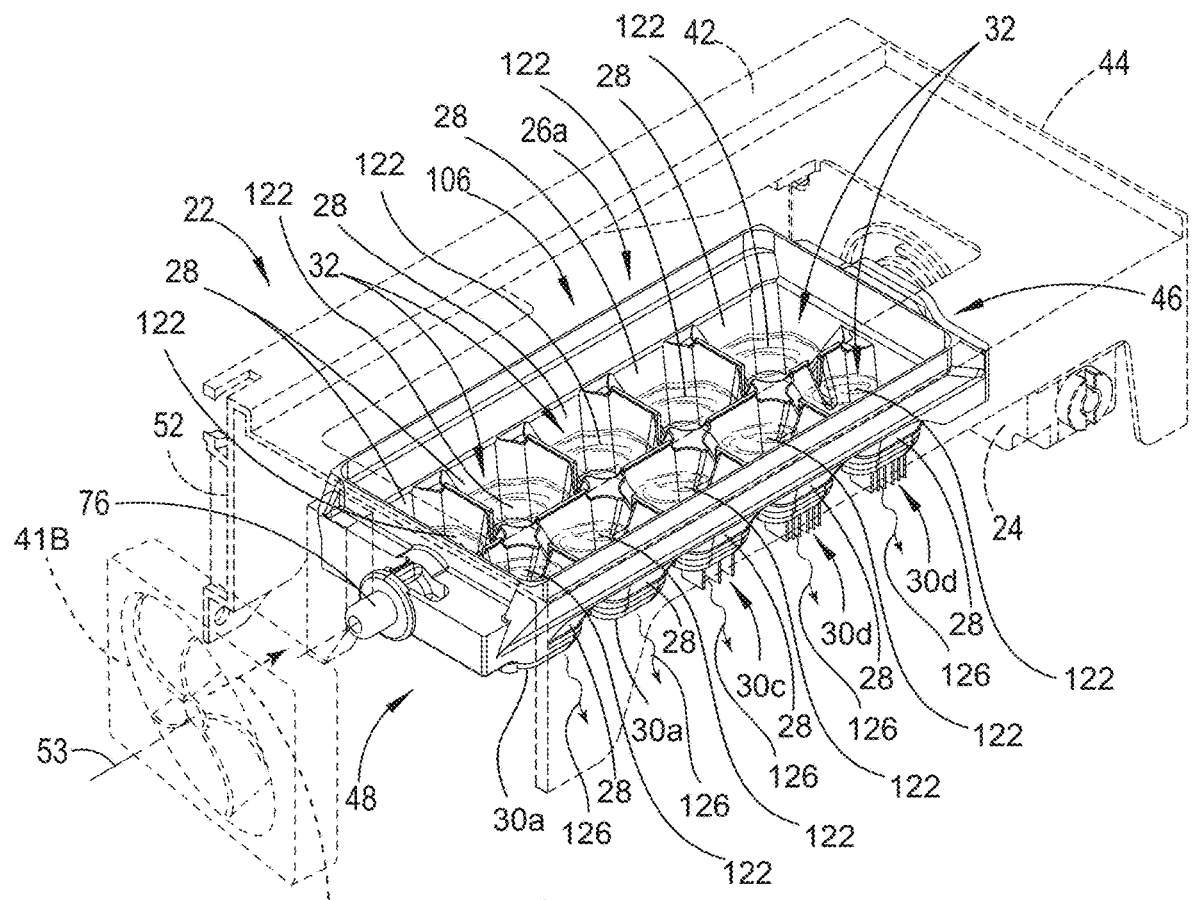
FIG. 23 is a top perspective view of an ice tray, illustrating heat flow proximate heat sinks.

Referring to FIGS. 18, 19, and 23, as the airflow from electrically powered fan 41B moves from the heat sinks 30*a* closest to the fan 41B to the heat sinks 30*d* furthest from the fan 41B, the temperature of the airflow may increase. Therefore, increasing the exposed surface areas of the heat sinks 30*a*, 30*c*, 30*d* as the respective distances $D_1$, $D_2$, $D_3$, $D_4$, and $D_5$ increase may contribute to maintaining a steady heat transfer rate q from the heat sinks 30*a*, 30*c*, 30*d* to the airflow. A steady heat transfer rate q from the heat sinks 30*a*, 30*c*, 30*d* to the airflow may aid in ice formation at a generally uniform rate in ice forming cavities 32.

Figure 20:
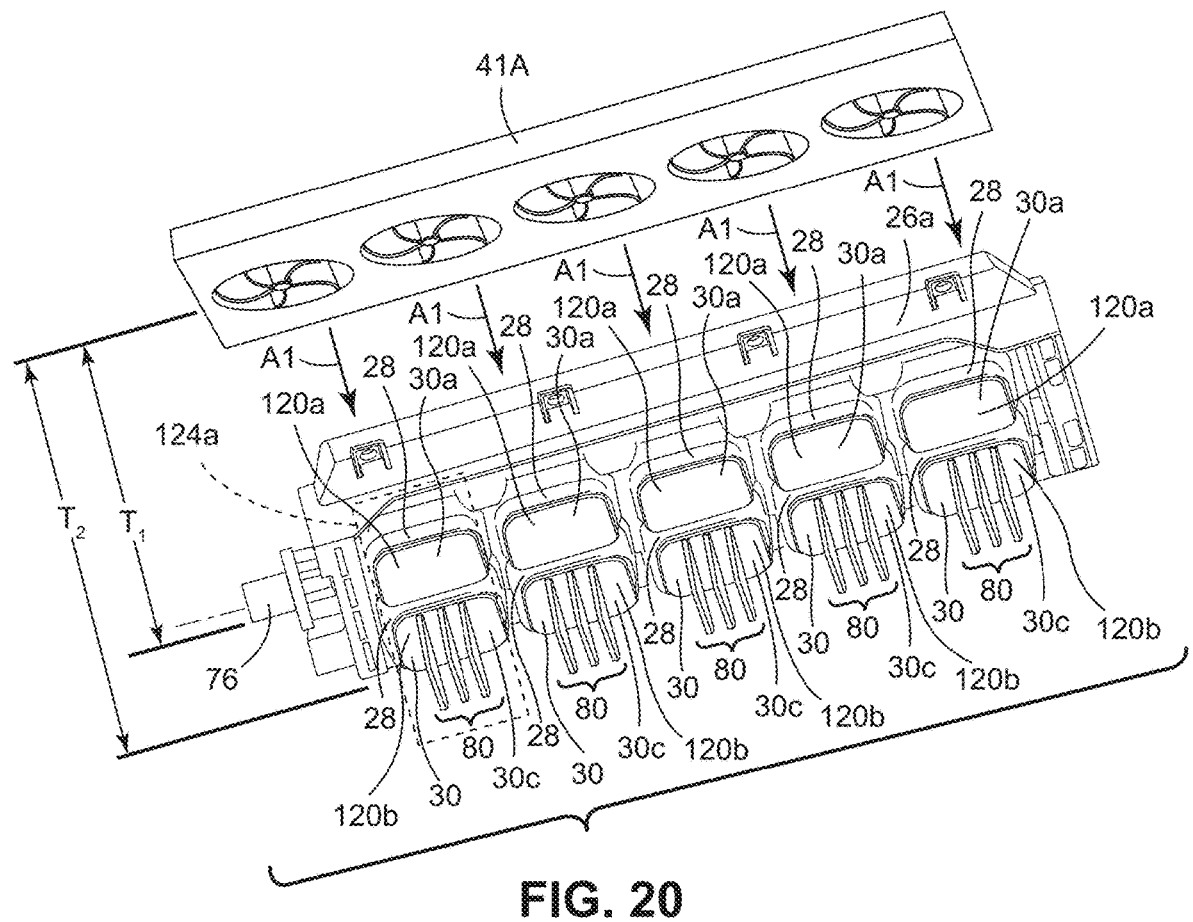
FIG. 20 is a perspective view of an ice tray according to another aspect of the present disclosure.

Referring now to FIG. 20, ice tray 26*a* is shown with the fan 41A positioned to move air along a substantially linear arrangement 124*a* of heat sinks 30 transverse to the axle member 76. Referring to FIG. 20, ice tray 26*a* is shown with electrically powered fan 41A that directs airflow in the direction of arrows A1. Airflow carries heat away from the exposed surface areas 120*a* of heat sinks 30*a* and the exposed surface areas 120*b* of heat sinks 30*c*. Airflow parallel to the downward extending fins 80 of heat sink 30*c* (in the direction of arrow A1) carries heat away from the downward extending fins 80 of heat sink 30*c*. As such, the heat sinks 30*a* and 30*c* are arranged sequentially so that the airflow from the fan 41A sequentially absorbs heat from heat sink 30*a* and heat sink 30*c*. That is, the exposed surface areas 120*a*, 120*b* of the respective heat sinks 30*a*, 30*c* progressively increase as the transverse distance ($T_1$, $T_2$) from the fan 41A to the heat sinks 30*a*, 30*c* increases.

Figure 21:
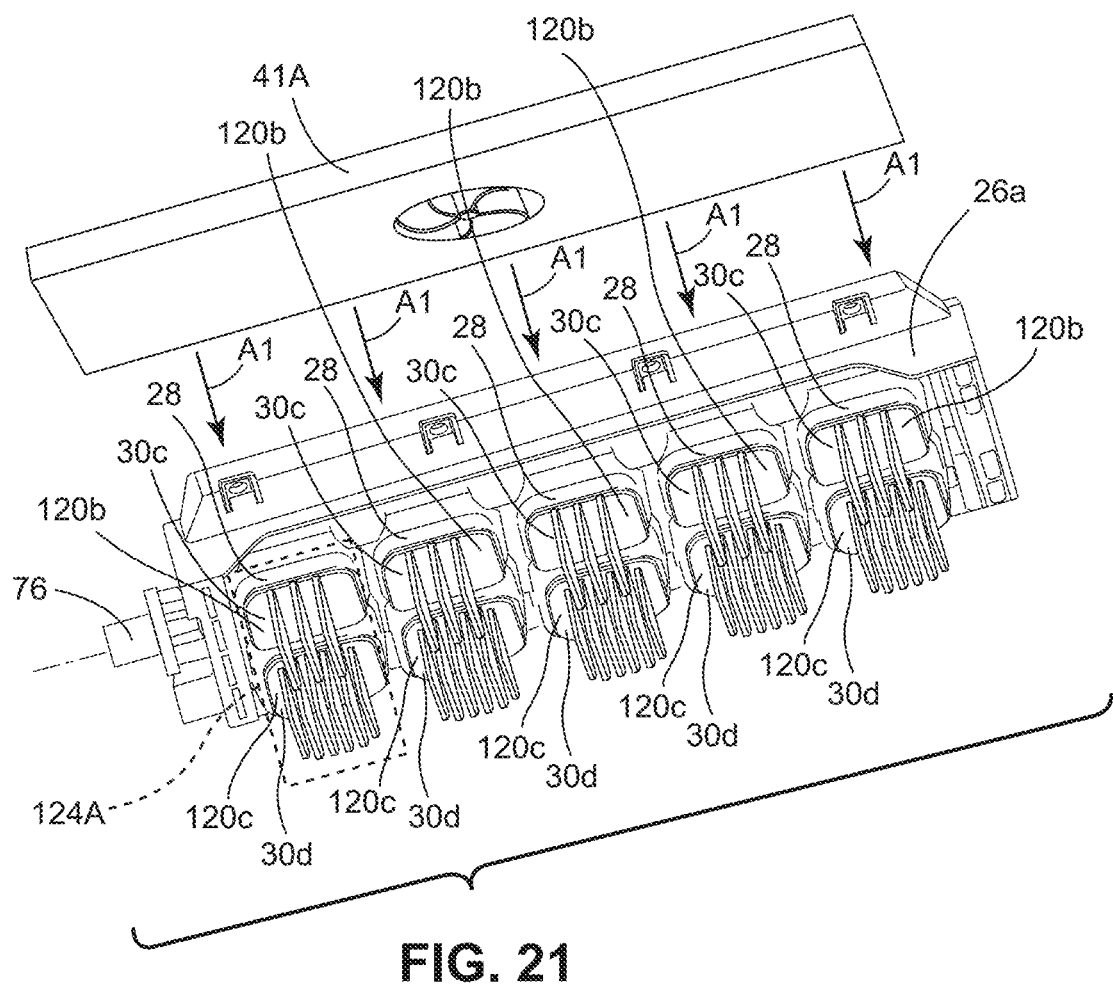
FIG. 21 is a perspective view of an ice tray according to another aspect of the present disclosure.

Referring now to FIG. 21, ice tray 26*a* is shown with heat sinks 30*c* and 30*d* arranged in a substantially linear arrangement 124*a* of heat sinks 30 transverse to the axle member 76. Airflow carries heat away from the exposed surface areas 120*b* of heat sinks 30*c* and the exposed surface areas 120*c* of heat sinks 30*d*. Airflow parallel to the downward extending fins 80 of heat sink 30*c* (in the direction of arrow A1) carries heat away from the downward extending fins 80 of the heat sink 30*c*. Airflow parallel to the downward extending fins 80 of heat sink 30*d* (in the direction of arrow A1) carries heat away from the downward extending fins 80 of the heat sink 30*d*. As such, the heat sinks 30*c* and 30*d* have been arranged sequentially so that the airflow from the fan 41A sequentially absorbs heat from heat sink 30*c* and heat sink 30*d*. That is, the exposed surface areas 120*b*, 120*c* of the respective heat sinks 30*c*, 30*d* progressively increase as the transverse distance ($T_1$, $T_2$) from the fan 41A to the heat sinks 30*c*, 30*d* increases.

Figure 22:
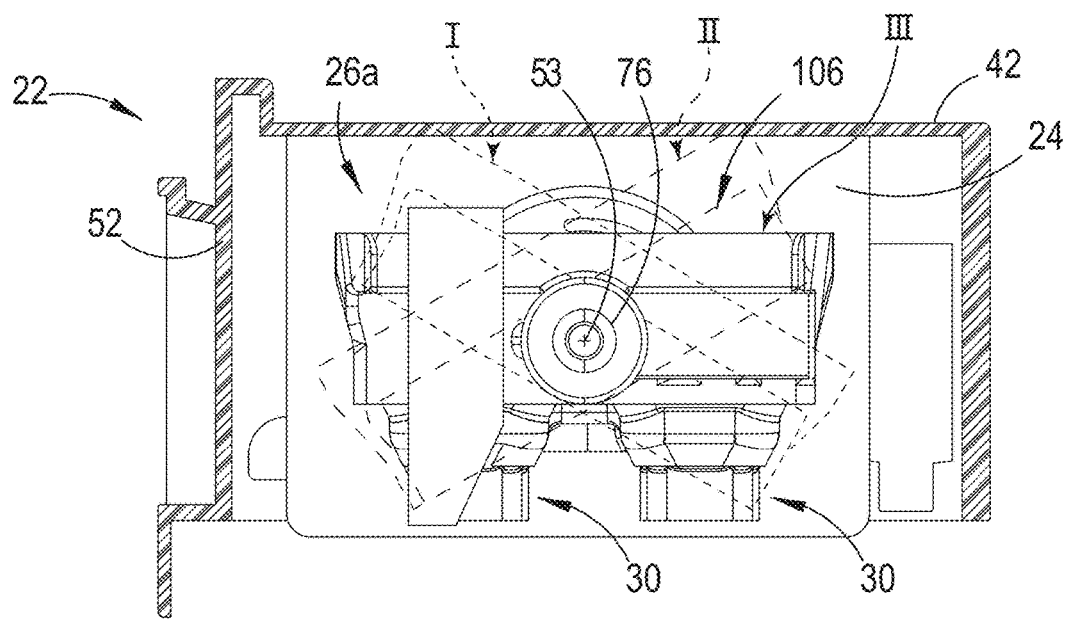
FIG. 22 is an end view of an ice tray in a rest position, a first position, and a second position relative to the ice maker housing.

Referring now to FIG. 22, an ice maker 22 that may rock during the ice forming process is shown. In the example shown, the ice tray 26*a* may rock between a first position I and a second position II to aid ice formation at a generally uniform rate in ice forming cavities 32. The ice tray 26*a* may pivot about axle member 76. The ice tray 26*a* is shown in a rest position III, a first position I, and a second position II. In one example, in the first position I, the ice tray 26*a* may be rotated approximately 30 degrees in a first direction from the rest position III. In one example, in the second position II, the ice tray 26*a* may be rotated approximately 30 degrees in a second direction from the rest position III. The continuous movement of the ice tray 26*a* between the first position I and the second position II may be described as rocking. Rocking of the ice tray 26*a* may promote unidirectional solidification of water 122 in the ice forming cavities 32.

As previously explained and as shown in FIGS. 16 and 16A, the ice tray 26 is rotated to an angle that will allow the water 122 to move in the ice forming cavities 32, if not already frozen. From such a tilted angle, the ice tray 26 may then be rotated in the opposite direction to an opposing tilted angle, which may then be repeated to oscillate the ice tray 26 in a rocking motion. Rocking the ice tray 26 is an optional processing technique that may be done with the ice maker 22 while water 122 is freezing in the ice forming cavities 32 to prevent the upper surface of the water 122 from freezing before the remaining water, thereby promoting clear ice formation with the ice maker 22.

Referring to FIG. 22, it is contemplated that the heat sinks 30 arranged in a substantially linear arrangement 124 parallel to the axle member 76 of the ice maker 22 may be used in an ice tray 26*a* that rocks between a first position I and a second position II during the ice formation process. It is contemplated that the substantially linear arrangement 124 of heat sinks 30 in the ice tray 26*a* having greater exposed surface areas 120 as the distance D from the electrically powered fan 41B to the heat sinks 30 increases may allow for steady heat transfer from the heat sinks 30 to the airflow during an ice formation process that includes rocking of the ice tray 26*a* between the first and second positions I, II.

Referring to FIG. 23, heat transfer (represented by arrows 126) from the heat sinks 30*a*, 30*c*, and 30*d* to the airflow from fan 41B in the direction of arrow B1 is shown. As previously explained with reference to ice tray 26, the heat sinks 30*a*, 30*c*, and 30*d* may be metal (e.g., aluminum). The metal (e.g., aluminum) heat sinks 30*a*, 30*c*, and 30*d* may be thermally conductive. As previously stated with reference to ice tray 26, the flexible structure 28 of the ice tray 26*a* may be made of a flexible polymeric material. The flexible structure 28 may be made of a material that may have a lower coefficient of thermal conductivity than the material of the heat sinks 30*a*, 30*c*, and 30*d*. The ice tray 26*a* may be made of a material that may have a lower coefficient of thermal conductivity than the material of the heat sinks 30*a*, 30*c*, and 30*d*. Thus, the ice tray 26*a* may be made from a material having greater flexibility than the material of the heat sinks 30*a*-30*d*, but the material of heat sinks 30*a*-30*d* may have greater heat transfer (higher coefficient of thermal conductivity) than the material of the ice tray 26*a*. As such, the materials utilized in the ice tray 26*a*, the flexible structure 28, and the heat sinks 30, as well as the sizes of the exposed surface areas 120 of the heat sinks 30 may contribute to the maintenance of a steady heat transfer rate q from the heat sinks 30 to the airflow during the ice formation process.

It will be understood that the surface to air heat transfer capability of surface ares 120 of heat sinks 30 may be increased or decreased utilizing other approaches such as different fin lengths/heights, increasing/decreasing surface irregularities, fin shape, fin length, etc.

It will be understood by one having ordinary skill in the art that construction of the described ice maker and other components is not limited to any specific material. Other exemplary embodiments disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature, unless otherwise stated.

It is also important to note that the construction and arrangement of the elements shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims, unless these claims by their language expressly state otherwise.

In various embodiments, the invention may be characterized in various clauses and various combinations thereof, including the following paragraphs:

An ice tray comprises a flexible structure defining sidewalls of first and second ice forming cavities and first and second heat sinks having an upper portion defining a bottom surface of the respective first and second ice forming cavities. An upward protruding flange extends from the bottom surface of each of the first and second ice forming cavities, wherein the flexible structure is molded around the upward protruding flange.

An ice tray, wherein the first heat sink is disposed a first distance from a fan, and the second heat sink is disposed a second distance from the fan. The first distance is less than the second distance.

An ice tray, wherein the first heat sink includes a first exposed surface area, and the second heat sink includes a second exposed surface area. The first exposed surface area is less than the second exposed surface area.

An ice tray, wherein the first exposed surface area includes a bottom surface that is one or more of the following: substantially planar, concave, or convex.

An ice tray, wherein the second exposed surface area includes one or more downward extending fins.

An ice tray, wherein the first exposed surface area includes one or more downward extending fins, and the second exposed surface area includes one or more downward extending fins.

An ice tray further comprising a third ice forming cavity, wherein the flexible structure defines sidewalls of the first, second, and third ice forming cavities. A third heat sink has an upper portion defining a bottom surface of the respective third ice forming cavity and an upward protruding flange extending from the bottom surface of each of the first, second, and third ice forming cavities, wherein the flexible structure is molded around the upward protruding flange.

An ice tray, wherein the first heat sink is disposed a first distance from the fan, the second heat sink is disposed a second distance from the fan, and the third heat sink is disposed a third distance from the fan. The first distance is less than the second distance, and the second distance is less than the third distance.

An ice tray, wherein the first heat sink has a first exposed surface area, the second heat sink has a second exposed surface area, and the third heat sink has a third exposed surface area. The first exposed surface area is less than the second exposed surface area, and the second exposed surface area is less than the third exposed surface area.

The ice tray, wherein the first exposed surface area includes a bottom surface that is one or more of the following: substantially planar, concave, or convex. The second exposed surface area includes one or more downward extending fins, and the third exposed surface area includes one or more downward extending fins.

An ice tray, wherein the second exposed surface area includes a plurality of downward extending fins, and the third exposed surface area includes a plurality of downward extending fins. The distance between the downward extending fins of the second exposed surface area is greater than the distance between the downward extending fins of the third exposed surface area.

An ice tray, wherein the ice tray includes a first end coupled to a harvest motor and a second end coupled to a bearing aperture, wherein a rotational axis is defined between the first end and the second end. One or more downward extending fins of the first exposed surface area and one or more downward extending fins of the second exposed surface area are arranged parallel to the rotational axis so that airflow parallel to the rotational axis flows between the one or more downward extending fins of the first exposed surface area and the one or more downward extending fins of the second exposed surface area and carries heat away from the one or more downward extending fins of the first exposed surface area and the one or more downward extending fins of the second exposed surface area.

An ice tray includes a first end coupled to a harvest motor and a second end coupled to a bearing aperture, wherein a rotational axis is defined between the first end and the second end. One or more downward extending fins of the first exposed surface area and one or more downward extending fins of the second exposed surface area are arranged transverse to the rotational axis so that airflow parallel to the rotational axis flows between the plurality of fins and carries heat away from the plurality of fins.

An ice maker, comprising a harvest motor, a fan, and an ice tray operably coupled to the harvest motor. The ice tray has a flexible structure and a plurality of heat sinks coupled to the flexible structure, wherein the heat sinks are disposed at bottom portions of ice forming cavities of the ice tray. Portions of the flexible structure are molded over portions of the plurality of heat sinks to form seals. The harvest motor is selectively operable to twist the ice tray about a rotational axis so that the flexible structure flexes and the plurality of heat sinks move relative to each other to release ice pieces from the ice forming cavities. The fan is positioned to direct an airflow along the plurality of heat sinks. Each of the plurality of heat sinks includes an exposed surface area that is configured to be exposed to the airflow. A first heat sink is located a first distance from the fan and defines a first exposed surface area, and a second heat sink is located a second distance from the fan and defines a second exposed surface area. The first distance is less than the second distance, and the first exposed surface area is less than the second exposed surface area.

An ice maker, wherein the plurality of heat sinks comprise the first heat sink including a bottom surface that is one or more of the following: substantially planar, concave, or convex. The second heat sink including a bottom surface having one or more fins, and a third heat sink including a bottom surface having two or more fins. The first heat sink is closest to the fan, the second heat sink is furthest from the fan, and the second heat sink is at an intermediate distance from the fan and between the first heat sink and the third heat sink. The exposed surface area that is configured to be exposed to the airflow of each of the plurality of heat sinks progressively increases as a distance from the fan of each of the plurality of heat sinks progressively increases.

An ice maker, wherein the first heat sink includes a pair of first heat sinks, and the third heat sink includes a pair of third heat sinks.

An ice maker, wherein each of the pair of third heat sinks includes more fins than the second heat sinks.

An ice maker, comprising a harvest motor, an axle member, and an ice tray operably coupled to the harvest motor and the axle member. The ice tray has a flexible structure and a plurality of heat sinks coupled to the flexible structure, wherein the heat sinks are disposed at bottom portions of ice forming cavities of the ice tray. The harvest motor is selectively operable to twist the ice tray about a rotational axis so that the flexible structure flexes. The plurality of heat sinks move relative to each other to release ice pieces form the ice forming cavities. The ice tray may be agitated between a first position and a second position in a rocking motion during ice formation. The plurality of heat sinks include a first heat sink with a first exposed surface area and a second heat sink with a second exposed surface area. The first exposed surface area is not equal to the second exposed surface area.

An ice maker, further comprises a fan, wherein the first heat sink and the second heat sink are positioned in a substantially linear arrangement parallel to or transverse to the axle member. The fan successively directs an airflow along the first heat sink and the second heat sink. The first exposed surface area of the first heat sink is less than the second exposed surface area of the second heat sink. A first heat transfer rate from the first heat sink to the airflow is substantially equal to a second heat transfer rate from the second heat sink to the airflow.

An ice maker, wherein the first heat transfer rate from the first heat sink to the airflow during ice formation is substantially equal to the second heat transfer rate from the second heat sink to the airflow during ice formation.

What is claimed is:

1. An ice tray, comprising:
a flexible structure defining sidewalls of first and second ice forming cavities; and
first and second heat sinks having an upper portion defining a bottom surface of the respective first and second ice forming cavities, and an upward protruding flange extending from the bottom surface of each of the first and second ice forming cavities, wherein the flexible structure is molded around the upward protruding flange.

2. The ice tray of claim 1, wherein:
the first heat sink is disposed a first distance from a fan;
the second heat sink is disposed a second distance from the fan; and
the first distance is less than the second distance.

3. The ice tray of claim 2, wherein:
the first heat sink includes a first exposed surface area;
the second heat sink includes a second exposed surface area; and
the first exposed surface area is less than the second exposed surface area.

4. The ice tray of claim 3, wherein:
the first exposed surface area includes a bottom surface that is one or more of the following: substantially planar, concave, or convex.

5. The ice tray of claim 3, wherein:
the first exposed surface area includes one or more downward extending fins; and
the second exposed surface area includes one or more downward extending fins.

6. The ice tray of claim 5, wherein:
the ice tray includes a first end coupled to a harvest motor and a second end coupled to a bearing aperture;
wherein a rotational axis is defined between the first end and the second end; and
wherein the one or more downward extending fins of the first exposed surface area and the one or more downward extending fins of the second exposed surface area are arranged parallel to the rotational axis so that airflow parallel to the rotational axis flows between the one or more downward extending fins of the first exposed surface area and the one or more downward extending fins of the second exposed surface area and carries heat away from the one or more downward extending fins of the first exposed surface area and the one or more downward extending fins of the second exposed surface area.

7. The ice tray of claim 5, wherein:
the ice tray includes a first end coupled to a harvest motor and a second end coupled to a bearing aperture, and wherein a rotational axis is defined between the first end and the second end, and the one or more downward extending fins of the first exposed surface area and the one or more downward extending fins of the second exposed surface area are arranged transverse to the rotational axis so that airflow parallel to the rotational axis flows between the plurality of fins and carries heat away from the plurality of fins.

8. The ice tray of claim 4, wherein:
the second exposed surface area includes one or more downward extending fins.

9. The ice tray of claim 1, further comprising:
a third ice forming cavity, wherein the flexible structure defines sidewalls of the first, second, and third ice forming cavities; and
a third heat sink having an upper portion defining a bottom surface of the respective third ice forming cavity, and an upward protruding flange extending from the bottom surface of each of the first, second, and third ice forming cavities, and wherein the flexible structure is molded around the upward protruding flange.

10. The ice tray of claim 9, wherein:
the first heat sink is disposed a first distance from the fan;
the second heat sink is disposed a second distance from the fan;
the third heat sink is disposed a third distance from the fan;
the first distance is less than the second distance; and
the second distance is less than the third distance.

11. The ice tray of claim 10, wherein:
the first heat sink has a first exposed surface area;
the second heat sink has a second exposed surface area;
the third heat sink has a third exposed surface area;
the first exposed surface area is less than the second exposed surface area; and
the second exposed surface area is less than the third exposed surface area.

12. The ice tray of claim 11, wherein:
the first exposed surface area includes a bottom surface that is one or more of the following: substantially planar, concave, or convex;
the second exposed surface area includes one or more downward extending fins; and
the third exposed surface area includes one or more downward extending fins.

13. The ice tray of claim 12, wherein:
the second exposed surface area includes a plurality of downward extending fins;
the third exposed surface area includes a plurality of downward extending fins; and
the distance between the downward extending fins of the second exposed surface area is greater than the distance between the downward extending fins of the third exposed surface area.

14. An ice maker, comprising:
a harvest motor;
a fan; and
an ice tray operably coupled to the harvest motor, the ice tray having a flexible structure and a plurality of heat sinks coupled to the flexible structure, wherein the heat sinks are disposed at bottom portions of ice forming cavities of the ice tray;
wherein portions of the flexible structure are molded over portions of the plurality of heat sinks to form seals;
wherein the harvest motor is selectively operable to twist the ice tray about a rotational axis so that the flexible structure flexes and the plurality of heat sinks move relative to each other to release ice pieces from the ice forming cavities;
wherein the fan is positioned to direct an airflow along the plurality of heat sinks;
wherein each of the plurality of heat sinks includes an exposed surface area that is configured to be exposed to the airflow; and
wherein a first heat sink is located a first distance from the fan and defines a first exposed surface area, and wherein a second heat sink is located a second distance from the fan and defines a second exposed surface area, and wherein the first distance is less than the second distance and the first exposed surface area is less than the second exposed surface area.

15. The ice maker of claim 14, wherein:
the plurality of heat sinks comprise:
the first heat sink including a bottom surface that is one or more of the following: substantially planar, concave, or convex;
the second heat sink including a bottom surface having one or more fins; and
a third heat sink including a bottom surface having two or more fins, wherein the first heat sink is closest to the fan, the second heat sink is furthest from the fan, the second heat sink is at an intermediate distance from the fan and between the first heat sink and the third heat sink, and wherein the exposed surface area that is configured to be exposed to the airflow of each of the plurality of heat sinks progressively increases as a distance from the fan of each of the plurality of heat sinks progressively increases.

16. The ice maker of claim 15, wherein:
the first heat sink includes a pair of first heat sinks; and
the third heat sink includes a pair of third heat sinks.

17. The ice maker of claim 16, wherein:
each of the pair of third heat sinks includes more fins than the second heat sink.

18. An ice maker, comprising:
a harvest motor;
an axle member;
an ice tray operably coupled to the harvest motor and the axle member, the ice tray having a flexible structure and a plurality of heat sinks coupled to the flexible structure, wherein the heat sinks are disposed at bottom portions of ice forming cavities of the ice tray;
wherein the harvest motor is selectively operable to twist the ice tray about a rotational axis so that the flexible structure flexes and the plurality of heat sinks move relative to each other to release ice pieces from the ice forming cavities;
wherein the ice tray may be agitated between a first position and a second position in a rocking motion during ice formation; and
wherein the plurality of heat sinks include a first heat sink with a first exposed surface area and a second heat sink with a second exposed surface area, and wherein the first exposed surface area is not equal to the second exposed surface area.

19. The ice maker of claim 18, further comprising:
a fan;
wherein the first heat sink and the second heat sink are positioned in a substantially linear arrangement parallel to or transverse to the axle member;
wherein the fan successively directs an airflow along the first heat sink and the second heat sink;
wherein the first exposed surface area of the first heat sink is less than the second exposed surface area of the second heat sink; and
wherein a first heat transfer rate from the first heat sink to the airflow is substantially equal to a second heat transfer rate from the second heat sink to the airflow.

20. The ice maker of claim 19, wherein:
the first heat transfer rate from the first heat sink to the airflow during ice formation is substantially equal to the second heat transfer rate from the second heat sink to the airflow during ice formation.

* * * * *